(12) United States Patent
Otomo et al.

(10) Patent No.: US 9,566,519 B2
(45) Date of Patent: Feb. 14, 2017

(54) GAME SYSTEM, GAME DEVICE CONTROL METHOD, PROGRAM, AND INFORMATION STORAGE MEDIUM

(75) Inventors: Hitoshi Otomo, Chiba (JP); Takeshi Okubo, Chiba (JP); Yoshinori Shiigi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 781 days.

(21) Appl. No.: 13/003,236

(22) PCT Filed: Mar. 17, 2009

(86) PCT No.: PCT/JP2009/055195
§ 371 (c)(1),
(2), (4) Date: Jan. 7, 2011

(87) PCT Pub. No.: WO2010/004787
PCT Pub. Date: Jan. 14, 2010

(65) Prior Publication Data
US 2011/0124385 A1 May 26, 2011

(30) Foreign Application Priority Data

Jul. 10, 2008 (JP) ................................. 2008-180802

(51) Int. Cl.
*A63F 13/56* (2014.01)
*A63F 13/812* (2014.01)
(Continued)

(52) U.S. Cl.
CPC .............. *A63F 13/56* (2014.09); *A63F 13/10* (2013.01); *A63F 13/812* (2014.09); *G06T 13/00* (2013.01);
(Continued)

(58) Field of Classification Search
CPC A63F 13/00; A63F 13/828; A63F 2300/5573; A63F 2300/8052
(Continued)

(56) References Cited

U.S. PATENT DOCUMENTS 6,280,323 B1   8/2001  Yamazaki et al.
6,398,647 B1 * 6/2002  Hirai et al. ..................... 463/31
(Continued)

FOREIGN PATENT DOCUMENTS

CN          101370561 A    2/2009
EP             1985338 A1   10/2008
(Continued)

OTHER PUBLICATIONS

NBA Live 2000 www.replacementdocs.com.*
(Continued)

*Primary Examiner* — Omkar Deodhar
*Assistant Examiner* — Eric M Thomas
(74) *Attorney, Agent, or Firm* — Sughrue Mion, PLLC

(57) ABSTRACT

Provided is a game system capable of discriminating types of action performed by a game character in more detail. A reproduction data acquiring section (46) saves a game situation obtained within a reproduction subject period as reproduction data if a shooting action is performed, an action determining section (48) determines based on the reproduction data whether or not a dummy action was performed by an operation subject object other than an operation subject object that performed the shooting action, and a playback video outputting section (50) performs an output based on a determination result by the action determining section (48) in accordance with outputting of a playback video based on the reproduction data.

17 Claims, 16 Drawing Sheets

(51) Int. Cl.
*A63F 13/40* (2014.01)
*G06T 13/00* (2011.01)

(52) U.S. Cl.
CPC .... *A63F 2300/65* (2013.01); *A63F 2300/6623* (2013.01); *A63F 2300/8011* (2013.01)

(58) Field of Classification Search
USPC .......................................................... 463/1–7
See application file for complete search history.

(56) References Cited

U.S. PATENT DOCUMENTS

| | | | |
|---|---|---|---|
| 2002/0108125 A1* | 8/2002 | Joao ................... | H04N 7/17309 725/139 |
| 2002/0119823 A1* | 8/2002 | Beuscher ................ | A63F 13/12 463/42 |
| 2007/0060389 A1 | 3/2007 | Shimizu et al. | |
| 2007/0105607 A1* | 5/2007 | Russell ............... | G06F 11/0709 463/1 |
| 2010/0029390 A1* | 2/2010 | Wei ................................ | 463/43 |
| 2010/0190551 A1 | 7/2010 | Iwakiri et al. | |

FOREIGN PATENT DOCUMENTS

| | | |
|---|---|---|
| JP | 10-201958 A | 8/1998 |
| JP | 2001187266 A | 7/2001 |
| JP | 3209988 B2 | 9/2001 |
| JP | 3227447 B2 | 11/2001 |
| JP | 2005-245795 A | 9/2005 |
| JP | 2005-319231 A | 11/2005 |
| JP | 2007-215713 A | 8/2007 |
| TW | 200735936 A | 10/2007 |

OTHER PUBLICATIONS

NBA 2K7 game manual www.replacementdocs.com.*
Chinese Office Action corresponding to Chinese Patent Application No. 20980115527.6, dated Nov. 5, 2012.
Chinese Office Action corresponding to Chinese Patent Application No. 200980115527.6, dated Nov. 5, 2012.
Japanese Office Action corresponding to Japanese Patent Application No. 2008-180802, dated Feb. 5, 2013.
International Report on Patentability and Written Opinion corresponding to International Patent Application No. PCT/JP2009/055195 received Feb. 11, 2011.
Taiwanese Office Action corresponding to Taiwanese Patent Application No. 98112150, dated Jul. 5, 2012.

* cited by examiner

| PLAYER ID | POSITION INFORMATION | DIRECTION INFORMATION | POSTURE INFORMATION | . . . | MARKING SUBJECT |
|---|---|---|---|---|---|
| 1 | — | — | — | — | — |
| 11 | — | — | — | — | — |
| 12 | — | — | — | — | 9 |
| 22 | — | — | — | — | — |

| KIND OF ACTION | BASAL EVALUATION VALUE |
|---|---|
| DRIBBLE | 10pt |
| ⋮ | ⋮ |
| THROUGH-PASS | 20pt |
| ⋮ | ⋮ |
| VOLLEY SHOT | 20pt |
| ⋮ | ⋮ |
| DUMMY ACTION | 40pt |

BALL-RELATED ACTION: DRIBBLE … THROUGH-PASS … VOLLEY SHOT …

SPECIFIC ACTION: DUMMY ACTION

GAME SYSTEM, GAME DEVICE CONTROL METHOD, PROGRAM, AND INFORMATION STORAGE MEDIUM

CROSS REFERENCE TO RELATED APPLICATIONS

This application is a National Stage of International Application No. PCT/JP2009/055195 filed Mar. 17, 2009, which claims priority from Japanese Patent Application No. 2008-180802 filed Jul. 10, 2008, the contents of all of which are incorporated herein by reference in their entirety.

TECHNICAL FIELDS

The present invention relates to a game system, a game device control method, a program, and an information storage medium for carrying out a game in which a plurality of game characters perform an action.

BACKGROUND ART

In a game (for example, soccer game) in which a plurality of game characters perform an action, outputting of a playback video that reproduces actions which each of the game characters performed is carried out.

For example, Patent Document 1 described below discloses a baseball game in which: (1) each time the game character performs an action, the action is identified; (2) if the action is a fixed action, an evaluation score corresponding to the fixed action is determined; and (3) if the evaluation score is high, the playback video is output. For example, in this baseball game, if the game character steals a base, it is detected that base stealing has been performed by the game character. Then, if the base stealing is the fixed action, an evaluation score corresponding to the base stealing is determined.

Patent Document 1: JP 3227447 B

DISCLOSURE OF THE INVENTION

Problems to be Solved by the Invention

Incidentally, in a case where a game character performs an action, even the same action being performed may differ in its purpose, depending on the situation.

For example, in an actual soccer match, a player sometimes performs a moving action for the purpose of making a shot and sometimes performs a moving action for the purpose of letting another player make a shot. For example, in order to let a given player make a shot in a region in front of a goal without any obstructions by opponent players, it is necessary to cause the opponent players to move away from the region in front of the goal before the given player makes a shot. Therefore, in order to cause the opponent players to move away from the region in front of the goal before the given player makes a shot, another player often performs a dummy action (so-called "dummy run") of making such a move as to attract the opponent player existing in the region in front of the goal. That is, another player may perform a moving action for the purpose of "letting the given player make a shot in the region in front of the goal without any obstructions by the opponent players".

In this case, at a point in time when a given player is moving while being accompanied by the opponent player, it cannot be determined whether or not the given player is performing a moving action for the purpose of "letting another player make a shot in the region in front of the goal without any obstructions by the opponent player", in other words, whether or not the given player is performing a dummy action, or whether or not the moving action is being performed for another purpose (for example, the purpose of receiving a pass). This is because it does not become apparent whether or not the action of moving while being accompanied by the opponent player is a dummy action until another player makes a shot without any obstructions by the opponent player (in a free state in which there is no opponent player nearby).

Therefore, with the technology of Patent Document 1, even if an action being performed by a given game character is identified as a moving action at a point in time when the given game character is moving while being accompanied by an opponent game character, it is difficult to determine whether or not the action is the moving action for the purpose of "letting another game character perform a shooting action in the region in front of the goal without any obstructions by the opponent game character", in other words, a "dummy action".

The present invention has been made in view of the above-mentioned problem, and one object thereof is to provide a game system capable of discriminating types of action performed by a game character in more detail, a game device control method, a program, and an information storage medium.

Means for Solving the Problems

In order to solve the above-mentioned problem, according to the present invention, there is provided a game system for carrying out a game in which a plurality of game characters perform an action. The game system includes: reproduction data acquiring means for acquiring reproduction data for reproducing the action performed by the plurality of game characters; output means for outputting a playback video based on the reproduction data acquired by the reproduction data acquiring means; and determination means for determining, based on the reproduction data acquired by the reproduction data acquiring means, whether or not a specific action was performed by any one of the plurality of game characters. The output means performs an output based on a determination result by the determination means in association with the outputting of the playback video.

Further, according to the present invention, there is provided a game device control method for a game device for carrying out a game in which a plurality of game characters perform an action. The control method includes: a reproduction data acquiring step of acquiring reproduction data for reproducing the action performed by the plurality of game characters; an output step of outputting a playback video based on the reproduction data acquired in the reproduction data acquiring step; and a determination step of determining, based on the reproduction data acquired in the reproduction data acquiring step, whether or not a specific action was performed by any one of the plurality of game characters. The output step includes performing an output based on a determination result of the determination step in association with the outputting of the playback video.

Further, according to the present invention, there is provided a program for causing a computer such as a stationary game machine (home-use game machine), a portable game machine, an arcade game machine, a mobile phone, a personal digital assistant (PDA), or a personal computer to function as a game device for carrying out a game in which a plurality of game characters perform an action. The program further causes the computer to function as: reproduction data acquiring means for acquiring reproduction data for reproducing the action performed by the plurality of game characters; output means for outputting a playback video based on the reproduction data acquired by the reproduction data acquiring means; and determination means for determining, based on the reproduction data acquired by the reproduction data acquiring means, whether or not a specific action was performed by any one of the plurality of game characters. The output means performs an output based on a determination result by the determination means in association with the outputting of the playback video.

Further, an information storage medium according to the present invention is a computer-readable information storage medium recorded with the above-mentioned program.

The present invention relates to a game system for carrying out a game in which a plurality of game characters perform an action. In the present invention, for example, a soccer game is carried out. Further, reproduction data for reproducing an action performed by the plurality of game characters is acquired. Then, a playback video based on the reproduction data acquired by the reproduction data acquiring means is output. Further, based on the reproduction data acquired by the reproduction data acquiring means, it is determined whether or not a specific action was performed by the game character. Further, in the case where the playback video is output, an output is performed based on a determination result by the determination means in association with the outputting of the playback video. According to the present invention, it is determined, based on the reproduction data, whether or not the specific action was performed by the game character, and hence it becomes possible to discriminate types of action performed by the game character in more detail. For example, it becomes possible to determine whether or not a dummy action was performed by a game character.

Further, according to an aspect of the present invention, the game system carries out a game in which a plurality of first game characters belonging to a first group and a plurality of second game characters belonging to a second group that opposes the first group perform an action; the game system further comprises judgment means for judging whether or not a reference action has been performed by any one of the plurality of first game characters; if the reference action has performed by any one of the plurality of first game characters, the determination means determines, based on the reproduction data, whether or not a state, in which none of the plurality of second game characters is positioned inside a determination region defined based on a position at the time of an action of the first game character which performed the reference action at the time of an action, was realized at the time of an action by a first game character other than the first game character which performed the reference action. If the state was realized at the time of an action by a first game character other than the first game character which performed the reference action, the determination means may determine that the specific action was performed before the time of an action by the first game character other than the first game character which performed the reference action.

Further, according to an aspect of the present invention, the game system may further include: association means for associating any one of the plurality of second game characters with any one of the plurality of first game characters; and movement control means for causing any one of the plurality of second game characters to move in accordance with movement of any one of the plurality of first game characters in a case where the any one of the plurality of second game characters is associated with the any one of the plurality of first game characters. The determination means may include: a first determination means for determining, if the reference action has been performed by any one of the plurality of first game characters, based on the reproduction data, whether or not any one of the plurality of second game characters was positioned inside the determination region at the time of an action; a second determination means for determining, based on the reproduction data, whether or not any one of the plurality of second game characters was positioned inside the determination region at a time earlier than the time of an action; and a third determination means for determining, if it is determined that none of the plurality of second game characters was positioned inside the determination region at the time of an action, and if it is determined that any one of the plurality of second game characters was positioned inside the determination region at the time earlier than the time of an action, based on the reproduction data, whether or not the second game character which was positioned inside the determination region at the time earlier than the time of an action moved out of the determination region before the time of an action in accordance with the movement of a first game character other than the first game character which performed the reference action. If it is determined that the second game character which was positioned inside the determination region at the time earlier than the time of an action, moved out of the determination region before the time of an action in accordance with the movement of a first game character other than the first game character which performed the reference action, the determination means may determine that the specific action was performed before the time of an action by the first game character other than the first game character which performed the reference action.

Further, according to an aspect of the present invention, the determination region may be a region whose range is defined at each time based on the position of the first game character which performed the reference action. The game system may further include: association means for associating any one of the plurality of second game characters with any one of the plurality of first game characters; and movement control means for causing any one of the plurality of second game characters to move in accordance with movement of any one of the plurality of first game characters in a case where the any one of the plurality of second game characters is associated with the any one of the plurality of first game characters; the determination means may include: a first determination means for determining, based on the reproduction data, whether or not any one of the plurality of second game characters was positioned inside the determination region at the time of an action; a second determination means for determining, based on the reproduction data, whether or not any one of the plurality of second game characters was positioned inside the determination region at a time earlier than the time of an action; and a third determination means for determining, if it is determined that none of the plurality of second game characters was positioned inside the determination region at the time of an action, and if it is determined that any one of the plurality of second game characters was positioned inside the determination region at the time earlier than the time of an action, based on the reproduction data, whether or not the second game character which was positioned inside the determination region at the time earlier than the time of an action, moved out of the determination region before the time of an action in accordance with the movement of a first game character other than the first game character which performed the reference action. If it is determined that the second game character which was positioned inside the determination region at the time earlier than the time of an action, moved out of the determination region before the time of an action in accordance with the movement of a first game character other than the first game character which performed the reference action, the determination means may determine that the specific action was performed before the time of an action by the first game character other than the first game character which performed the reference action.

Further, according to an aspect of the present invention, the game system may further include movement restricting means for restricting, if any one of the second game characters collides with any one of the first game characters, movement of the second game character. The determination means may include: a first determination means for, if the reference action has been performed by any one of the plurality of first game characters, determining, based on the reproduction data, whether or not any one of the plurality of second game characters was positioned inside the determination region at the time of an action; and a second determination means for determining, based on the reproduction data, whether or not any one of the plurality of second game characters, which had been moving toward the determination region or the first game character which performed the reference action, collided outside the determination region with a first game character other than the first game character which performed the reference action at the time earlier than the time of an action. If none of the plurality of second game characters was positioned inside the determination region at the time of an action, and if the second game character, which had been moving toward the determination region or the first game character which performed the reference action, collided with a first game character other than the first game character which performed the reference action outside the determination region at the time earlier than the time of an action, the determination means may determine that the specific action was performed before the time of an action by the first game character other than the first game character which performed the reference action.

Further, according to an aspect of the present invention, the game system may further include evaluation means for determining, based on the determination result by the determination means, an evaluation of the action of the plurality of game characters which is reproduced by the reproduction data and the output based on the determination result may be an output of the evaluation determined by the evaluation means.

Further, according to an aspect of the present invention, if the determination means determines that the specific action was performed before the time of an action by the a first game character other than the first game character which performed the reference action, the output means may output the playback video including an image for showing a moving path of the first game character which performed the specific action.

Further, according to an aspect of the present invention, the game system may carry out the game in which the plurality of first game characters and the plurality of second game characters perform an action in a game space. The playback video may be a video indicating a state of the game space viewed from a viewpoint. The output means may include setting means for setting the viewpoint, if the determination means determines that the specific action was performed before the time of an action by the a first game character other than the first game character which performed the reference action, based on the position of the first game character which performed the specific action.

Further, according to an aspect of the present invention, the game may be a sports game in which a moving object moves. The plurality of game characters may include a plurality of operation subject characters each corresponding to each of a plurality of users. The game system may further include: number-of-characters acquiring means for acquiring, based on the reproduction data, a number of operation subject characters that performed an action related to the moving object among the plurality of operation subject characters; and condition determining means for determining whether or not the number of operation subject characters acquired by the number-of-characters acquiring means satisfies a predetermined condition. The game system may output the playback video if the number of operation subject characters acquired by the number-of-characters acquiring means satisfies the predetermined condition.

BEST MODES FOR CARRYING OUT THE INVENTION

Figure 1:
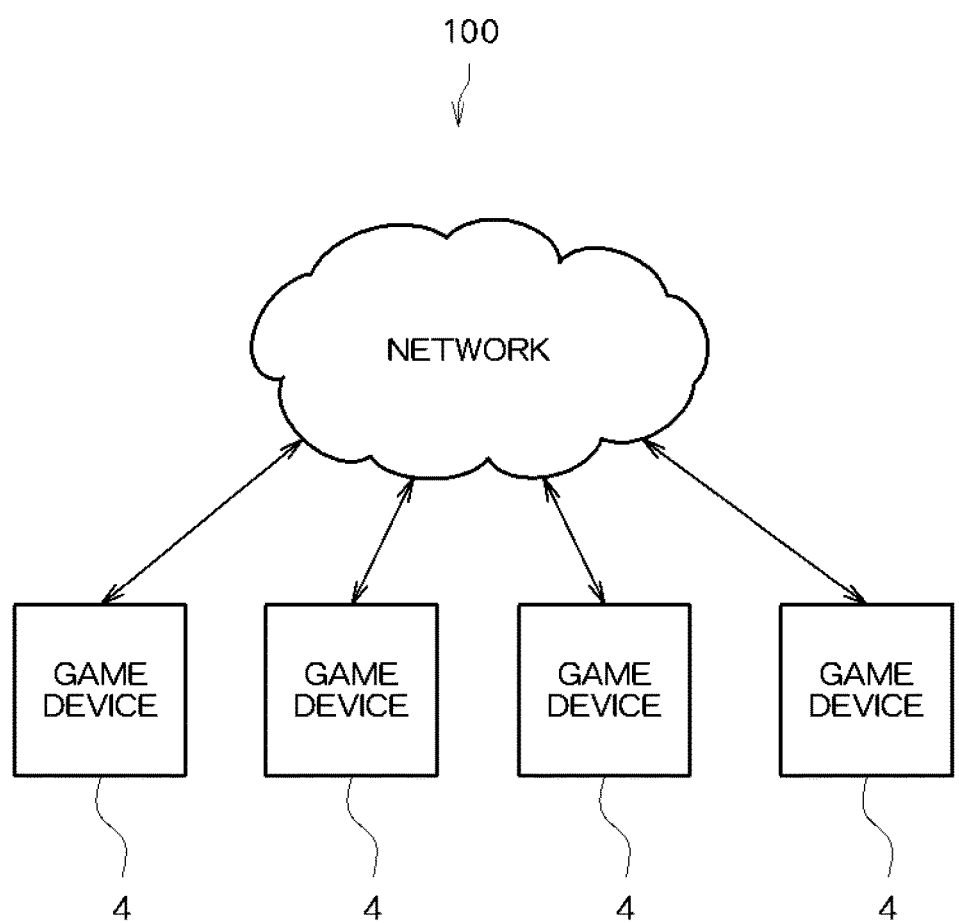
FIG. 1 is a diagram illustrating a configuration of a game system including game devices according to an embodiment of the present invention.

FIG. 1 is a diagram illustrating an entire configuration of a game system 100 according to a first embodiment of the present invention. As illustrated in FIG. 1, the game system 100 includes a plurality of game devices 4 (here, 4 machines). The game devices 4 are each connected to a network such as an Internet, and can exchange data with each other.

The game device 4 is a computer system including, for example, a microprocessor, a main memory, a hard disk storage device, a disk reader, a communication interface, an operation section, an image processing section, and a monitor. Note that examples of the operation section are, for example, a game controller and a mouse. Further, the disk reader is a device for reading a storage content of, for example, an optical disk (information storage medium). Further, the communication interface is an interface for connecting the game device 4 to the network. Further, the image processing section includes a VRAM, and draws a game screen in the VRAM based on image data transmitted from the microprocessor. The image processing section then converts its content into a video signal and outputs the video signal to the monitor at a predetermined time. The game device 4 is constituted by, for example, a conventionally known machine such as a home-use game machine, a portable game machine, a personal digital assistant, a mobile phone, or a personal computer.

In the game system 100 having the above-mentioned configuration, (a) shared game situation data is retained in the main memory of each of the game devices 4, (b) the shared game situation data is updated based on the content of an operation performed on each of the game devices 4, and (c) the monitor of each of the game devices 4, displays a game screen based on the shared game situation data, thereby realizing a network game that is performed by users of the respective game devices 4 participating simultaneously.

In the game system 100, the game devices 4 each have a client function, and one of the game devices 4 has a server function. Here, the server function represents a function for sharing game situation data retained in each of the game devices 4, which is a function of, for example, (a) updating the game situation data based on the content of an operation performed on each of the game devices 4, and (b) reflecting the updated content on the game situation data retained in the other game devices 4 with the result that the updated content is reflected on the game screens on the other game devices 4. Further, the client function is a function of, for example, (a) supplying the content of a user's operation to the server function, and (b) updating the game screen based on the game situation data updated by the server function. In the game system 100, various information (including, for example, operation information and update information on the game situation data) is exchanged between the server function of one of the game devices 4 and the client functions of the respective game devices 4, thereby implementing the above-mentioned network game.

In this embodiment, a soccer game performed in a game space is implemented. In this embodiment, the soccer game is performed between an operation subject team operated by the user of each of the game devices 4 and an opposing team operated by a computer. A shared game space is built in the main memory of each of the game devices 4 based on the game situation data, and a game screen indicating a state in which the game space is viewed from a virtual camera (viewpoint) is displayed on the monitor of each of the game devices 4.

Figure 2:
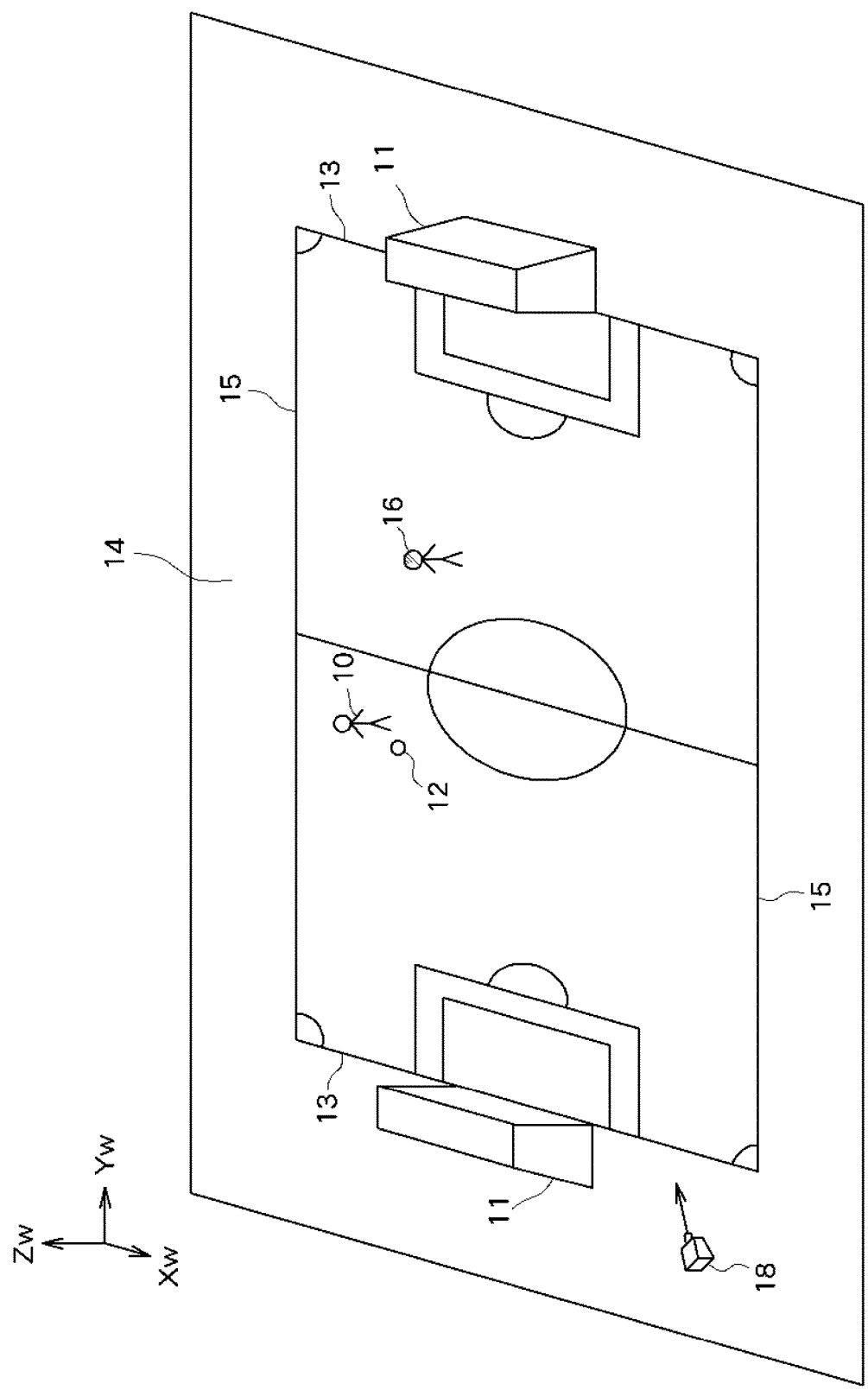
FIG. 2 is a diagram illustrating an example of a game space.

FIG. 2 is a diagram illustrating the state of the game space built in the main memory of each of the game devices 4. Here, the game space is described as a three-dimensional space in which three coordinate axes (Xw-axis, Yw-axis, and Zw-axis) are set. Located in the game space are eleven player objects 10 (first game characters) of the operation subject team (first group), eleven player objects 16 (second game characters) of the opposing team (second group), a ball object 12 (moving object), a field object 14 indicating a soccer stadium, goal objects 11 of the respective teams, and the like. The field object 14 includes goal lines 13 and side lines 15. A competition is held in a pitch surrounded by two goal lines 13 and two side lines 15. Also set in the game space is a virtual camera 18 that moves in accordance with the ball object 12. The virtual camera 18 has its viewing direction set to a direction for viewing the ball object 12, for example. Hereinafter, the player object 10 of the operation subject team is referred to as "operation subject object 10", while the player object 16 of the opposing team is referred to as "opponent object 16". Note that FIG. 2 illustrates one of the operation subject objects 10 and one of the opponent objects 16.

In this embodiment, four of the eleven operation subject objects 10 are each operated by a predefined user. Hereinafter, the operation subject object 10 operated by the user is referred to as "user object (operation subject character)". The user objects each perform a dribbling action, a passing action, a shooting action, and the like according to the contents of the user's operations. Further, the operation subject objects 10 other than the user objects and the respective opponent objects 16 each perform a dribbling action, a passing action, a shooting action, a trapping action, and the like according to a predetermined algorithm. Note that in a case where a player object traps the ball object 12 passed from another player object of the same team, the trapping action of the player object is displayed on the monitor as an "action of receiving a pass".

Further, it is determined by known collision detection processing whether or not a collision of the player objects has occurred. If a collision of the player objects occurs, the player objects involved in the collision have their movement restricted for a fixed time. For example, if the operation subject object 10 and the opponent object 16 collide with each other, the operation subject object 10 and the opponent object 16 have their movement restricted for a fixed time.

In this soccer game, when the ball object 12 moves to the goal object 11 of one team, a scoring event for the other team occurs. The respective users cooperate together in order to generate more scoring events than the opposing team.

Figures 3, 4:
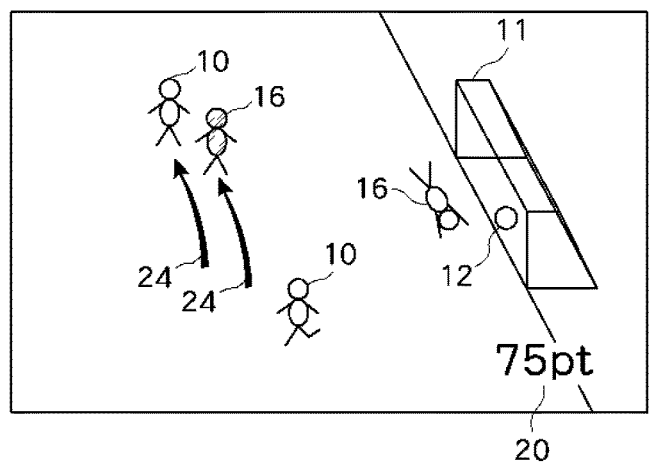
FIG. 3 is a diagram illustrating an example of storage contents of game situation data.
FIG. 4 is a diagram illustrating an example of a playback video.

FIG. 3 is a diagram illustrating the game situation data retained by the respective game devices 4. As illustrated in the figure, the game situation data includes, for example, a player ID of each player object, position information indicating a position of each player object, direction information indicating a moving direction of each player object, and posture information indicating a posture of each player object. In addition, the game situation data includes position information indicating a position of the ball object 12, direction information indicating a moving direction of the ball object 12, information for identifying the player keeping the ball object 12, information for identifying the user object, and information indicating a position and the viewing direction of the virtual camera 18. The player ID represents data for identification of the player object. Here, the player IDs "1 to 11" are assigned to the operation subject objects 10, and the player IDs "12 to 22" are assigned to the opponent objects 16. The position information on each player object represents, for example, position coordinates of each player object. Further, the direction information on each player object represents, for example, a direction vector indicating a front direction of each player object. Further, the posture information on each player object includes, for example, an ID of motion data representing an action being performed by each player object (in other words, ID of motion data being reproduced currently) and a reproduction position of the motion data.

Note that in this embodiment, one marking subject is set for each of at least one of the player objects. That is, any one of the operation subject objects 10 is set for any one of the opponent objects 16 as the marking subject which the opponent object 16 should monitor. Also any one of the opponent objects 16 is set for any one of the operation subject objects 10 as the marking subject which the operation subject object 10 should monitor. The game situation data (association means) stores the player ID of the marking subject in association with the player object for which the marking subject is set. For example, in a case where the marking subject is set for any one of the opponent objects 16, the player ID of the operation subject object 10 set as the marking subject is stored in association with the player ID of the opponent object 16 (see FIG. 3). In the case where the marking subject is set for the player object, the player object moves autonomously in accordance with the movement of the marking subject based on a predetermined algorithm. For example, in the case where the marking subject is set for the player object, the player object moves such that the distance from the marking subject is kept at less than a predetermined distance.

The above-mentioned soccer game has a replay function. That is, this soccer game is configured so that, for example, when a scoring event for the operation subject team occurs by the shooting action of the operation subject object 10, a playback video including a scene in which the operation subject object 10 is performing the shooting action is displayed on the game screen. FIG. 4 illustrates an example of the game screen on which the playback video is displayed.

Further, the above-mentioned soccer game is configured so that it is determined whether or not a dummy action has been performed before the shooting action of the operation subject object 10 by another operation subject object 10, and that an evaluation value 20 corresponding to a determination result of whether or not the dummy action has been performed by another operation subject object 10 is displayed in the playback video (see FIG. 4). Hereinafter, description is given of this point.

Figures 5, 6:
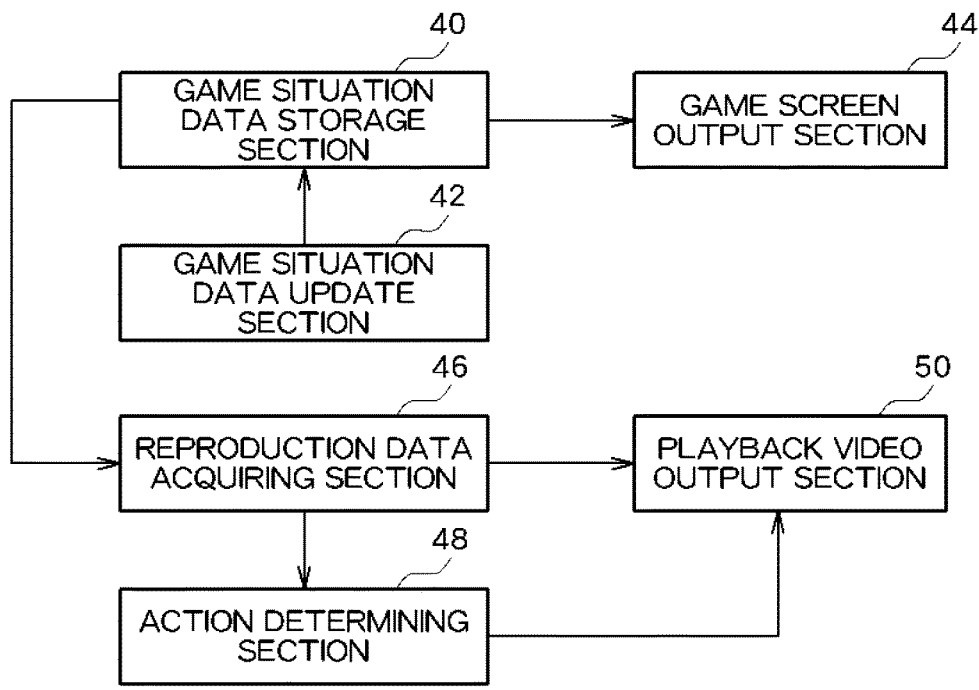
FIG. 5 is a diagram illustrating functional blocks of the game device according to the embodiment of the present invention.
FIG. 6 is a diagram illustrating an example of basal evaluation data.

FIG. 5 is a functional block diagram mainly illustrating functions related to the present invention among the functions implemented by each of the game devices 4. As illustrated in the figure, each of the game devices 4 functionally includes a game situation data storage section 40, a game situation data update section 42, a game screen output section 44, a reproduction data acquiring section 46 (judgment means and reproduction data acquiring means), an action determining section 48 (determination means), and a playback video output section 50 (output means). Those functions are implemented by the microprocessor executing the program read from the optical disk.

First described are the functional blocks for implementing a basic function of a soccer game (i.e., function of carrying out a game that imitates a soccer match). The game situation data storage section 40, the game situation data update section 42, and the game screen output section 44 are the functional blocks for implementing the basic function.

The game situation data storage section 40 is implemented mainly by the main memory. The game situation data storage section 40 stores the game situation data described above.

In this embodiment, the game situation data storage section 40 stores the game situation data obtained every predetermined time (for example, $\frac{1}{60}^{th}$ of a second) within a period (hereinafter, referred to as "reproduction subject period") between the time a predetermined amount of time (for example, 5 seconds) before and the present time.

The game situation data update section 42 is implemented mainly by the microprocessor. The game situation data update section 42 updates the game situation data stored in the game situation data storage section 40.

For example, in the case where the game device 4 has the server function, the game situation data update section 42 acquires the content of each user's operation from the operation section and the network, and updates the position, the moving direction, the posture, and the like of the user objects based on the content of each user's operation. In addition, for example, according to a predetermined algorithm, the game situation data update section 42 updates the position, the moving direction, the posture, and the like of the player objects other than the user object. In addition, for example, according to a predetermined algorithm, the game situation data update section 42 switches over the marking subject set for the player object under a predetermined condition. In addition, for example, in the case where the marking subject is set for any one of the player objects, the game situation data update section 42 (movement control means) causes the player object to move in accordance with the movement of the marking subject. For example, each time the marking subject of the player object makes a move, the moving direction of the player object is updated to a direction that extends from the player object toward the marking subject. In addition, for example, the game situation data update section 42 (movement restricting means) executes the known collision detection processing to thereby determine whether or not a collision of the player objects has occurred. If a collision of the player objects occurs, the movements of the player objects are restricted for a fixed time. For example, the updating of the positions of the player objects is restricted for a fixed time. After the game situation data is thus updated, the update information indicating the update content is transmitted to the other game devices 4.

Meanwhile, in the case where the game device 4 has only the client function, the game situation data update section 42 updates the game situation data based on the update information transmitted from the game device 4 having the server function.

The game screen output section 44 is implemented mainly by, for example, the microprocessor and the image processing section. Based on the game situation data stored in the game situation data storage section 40, the game screen output section 44 causes the monitor to display the game screen indicating the state in which the game space is viewed from the virtual camera 18.

Next, description is given of the functional blocks for implementing the replay function. The reproduction data acquiring section 46, the action determining section 48, and the playback video output section 50 are the functional blocks for implementing the replay function.

The reproduction data acquiring section 46 is implemented mainly by the microprocessor and the main memory. The reproduction data acquiring section 46 acquires reproduction data for reproducing an action performed by each of the player objects. In this embodiment, the reproduction data acquiring section 46 (judgment means) judges whether or not the shooting action has been performed by the operation subject object 10. In addition, if judging that the shooting action has been performed by the operation subject object 10, the reproduction data acquiring section 46 monitors an occurrence of a match interrupting event during a predetermined monitoring period which starts from that time. Here, the monitoring period is a period (for example, 3 seconds) shorter than the above-mentioned reproduction subject period. In addition, the match interrupting event is, for example, the scoring event for the operation subject team, an event where the ball object 12 moves out of the pitch, and another such event that triggers an interruption of the soccer match.

Then, if the match interrupting event occurs during the above-mentioned monitoring period, the reproduction data acquiring section 46 reads and acquires the "game situation data obtained every predetermined time (for example, 1/60th of a second) within the reproduction subject period" stored in the game situation data storage section 40, and saves the game situation data in the main memory as the reproduction data. As described above, in this embodiment, when the shooting action is performed, the reproduction data is acquired. Therefore, the shooting action may be interpreted as an action which triggers acquisition of the reproduction data.

The action determining section 48 is implemented mainly by the microprocessor and the main memory. In this embodiment, the action determining section 48 stores basal evaluation data in which each of different kinds of action is associated with a basal evaluation value. FIG. 6 illustrates an example of storage contents of the basal evaluation data. Here, the respective actions stored in the basal evaluation data are roughly classified into: an "action that is related to the ball object 12" (hereinafter, referred to as "ball-related action") including the dribbling action, the passing action, and the shooting action; and an action (specific action) performed when the ball object 12 is not held. Here, it is assumed that the specific action is the dummy action called "dummy run".

In this embodiment, the action determining section 48 that is storing the basal evaluation data determines whether or not the action stored in the basal evaluation data was performed by the operation subject object 10 based on the reproduction data acquired by the reproduction data acquiring section 46. Then, based on the basal evaluation value corresponding to the action performed by the operation subject object 10, the action determining section 48 (evaluation means) determines an evaluation value of the action performed by each of the operation subject objects 10 during the reproduction subject period. For example, based on the basal evaluation value corresponding to the action performed by the operation subject object 10, the action determining section 48 performs predetermined computation to thereby calculate the evaluation value. In addition, for example, a sum of the basal evaluation values corresponding to the actions performed by the operation subject object 10 is calculated as the evaluation value.

Hereinafter, description is given of an aspect in which it is determined whether or not the dummy action was performed by the operation subject object 10.

To determine whether or not the dummy action was performed by the operation subject object 10, the action determining section 48 (first determination means) determines, based on the reproduction data, whether or not a state in which none of the opponent objects 16 is positioned inside a determination region defined based on the position of the operation subject object 10 that performed a reference action (hereinafter, reference player object), was realized at a reference time by the operation subject object 10 other than the reference player object. Then, if the state in which none of the opponent objects 16 is positioned inside the above-mentioned determination region was realized at the reference time by the operation subject object 10 other than the reference player object, the action determining section 48 determines that the dummy action was performed by the operation subject object 10. Here, the reference time is the time at which the reference player object performed the reference action. Further, the determination region is, for example, a region within a predetermined range including the position at the reference time of the reference player object. For example, the determination region is a region of a concentric circle having a radius of R with the position of the reference player object at the reference time as its center. Note that here, the reference action is assumed to be the shooting action. Accordingly, here, the shooting action is not only the action which triggers acquisition of the reproduction data but also the reference action.

In other words, the action determining section 48 (first determination means) references the reproduction data (in particular, position information on each of the player objects) and determines whether or not any one of the opponent objects 16 was positioned inside the above-mentioned determination region at the reference time.

In addition, the action determining section 48 (second determination means) references the reproduction data and determines whether or not any one of the opponent objects 16 was positioned inside the above-mentioned determination region at a time earlier than the reference time.

Then, if none of the opponent objects 16 was positioned inside the determination region at the reference time, and if any one of the opponent objects 16 was positioned inside the above-mentioned determination region at the time earlier than the reference time, the action determining section 48 (third determination means) references the reproduction data and determines whether or not the opponent object 16 positioned inside the determination region (hereinafter, noted opponent object) at the time earlier than the reference time had the marking subject set therefor at least at a "time immediately before the noted opponent object moved from inside the determination region to outside the determination region". For example, the action determining section 48 determines whether or not the noted opponent object had the marking subject set therefor at the "time immediately before the noted opponent object moved from inside the determination region to outside the determination region". Alternatively, for example, the action determining section 48 determines whether or not the noted opponent object had the marking subject set therefor at both the "time immediately before the noted opponent object moved from inside the determination region to outside the determination region" and a "time immediately after the noted opponent object moved from inside the determination region to outside the determination region". Alternatively, for example, the action determining section 48 determines whether or not the noted opponent object had the marking subject set therefor at all of times between the "time immediately before the noted opponent object moved from inside the determination region to outside the determination region" and the reference time.

Then, if the noted opponent object had the marking subject set therefor at least at the "time immediately before the noted opponent object moved from inside the determination region to outside the determination region", the action determining section 48 determines that the dummy action was performed by the operation subject object 10 (precisely, the marking subject of the noted opponent object). In other words, the action determining section 48 determines that the dummy action was performed by the operation subject object 10 (precisely, the marking subject of the noted opponent object) if it is possible to confirm all of the following facts that: a "state in which none of the opponent objects 16 is positioned inside the determination region" (State 1) was realized at the reference time; a "state in which any one of the opponent objects 16 is positioned inside the determination region" (State 2) was realized at the time earlier than the reference time; and a "state in which the opponent object has the marking subject set therefor" (State 3) was realized at least at the "time immediately before the noted opponent object moved from inside the determination region to outside the determination region".

Here, description is given of the reason why the action determining section 48 determines that the dummy action was performed if it is possible to confirm all of the facts that: State 1 described above was realized at the reference time; State 2 described above was realized at the time earlier than the reference time; and State 3 described above was realized at least at the "time immediately before the noted opponent object moved from inside the determination region to outside the determination region".

Figure 7:
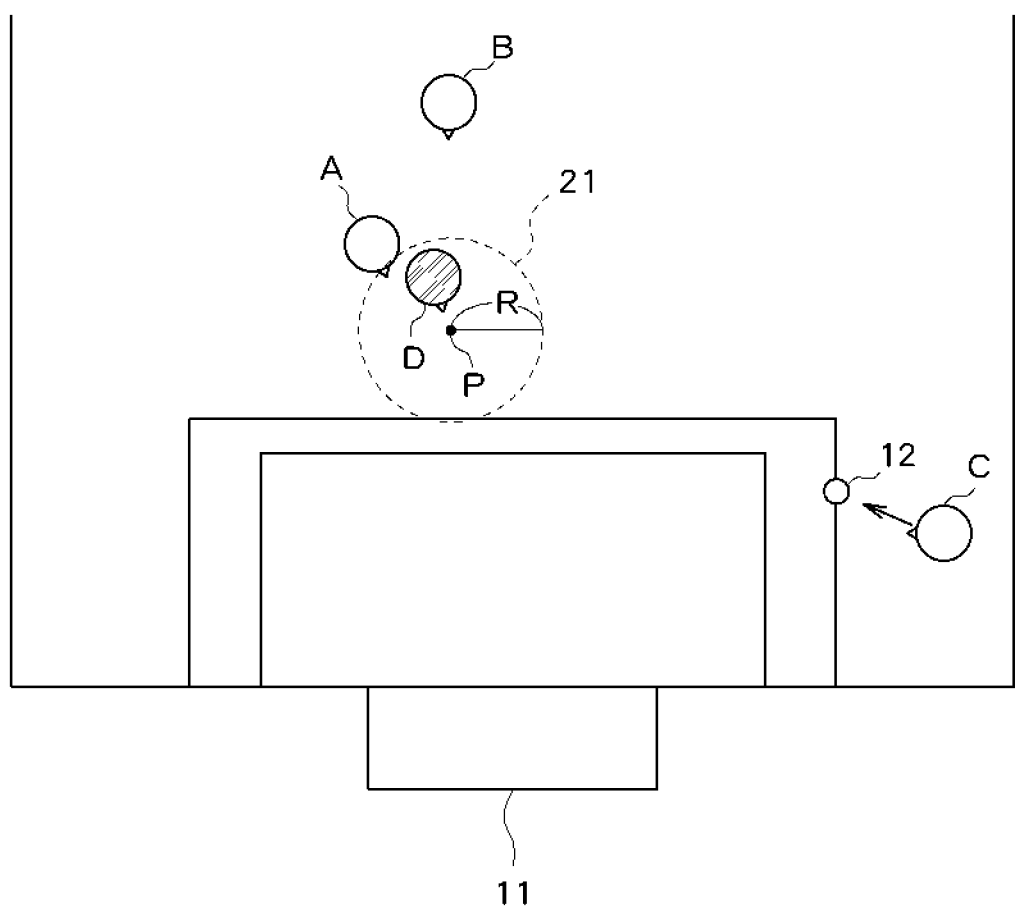
FIG. 7 is a diagram useful for description of a specific action (first dummy action)
Figure 8:
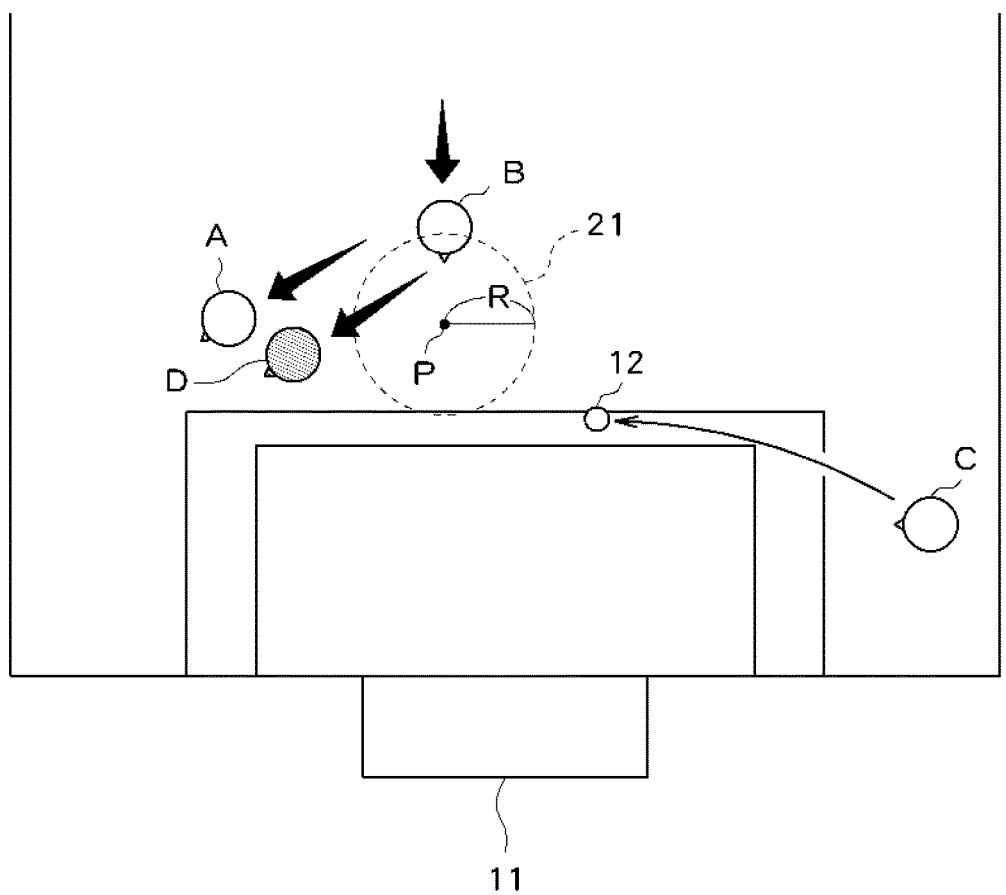
FIG. 8 is a diagram useful for description of the specific action (first dummy action)
Figure 9:
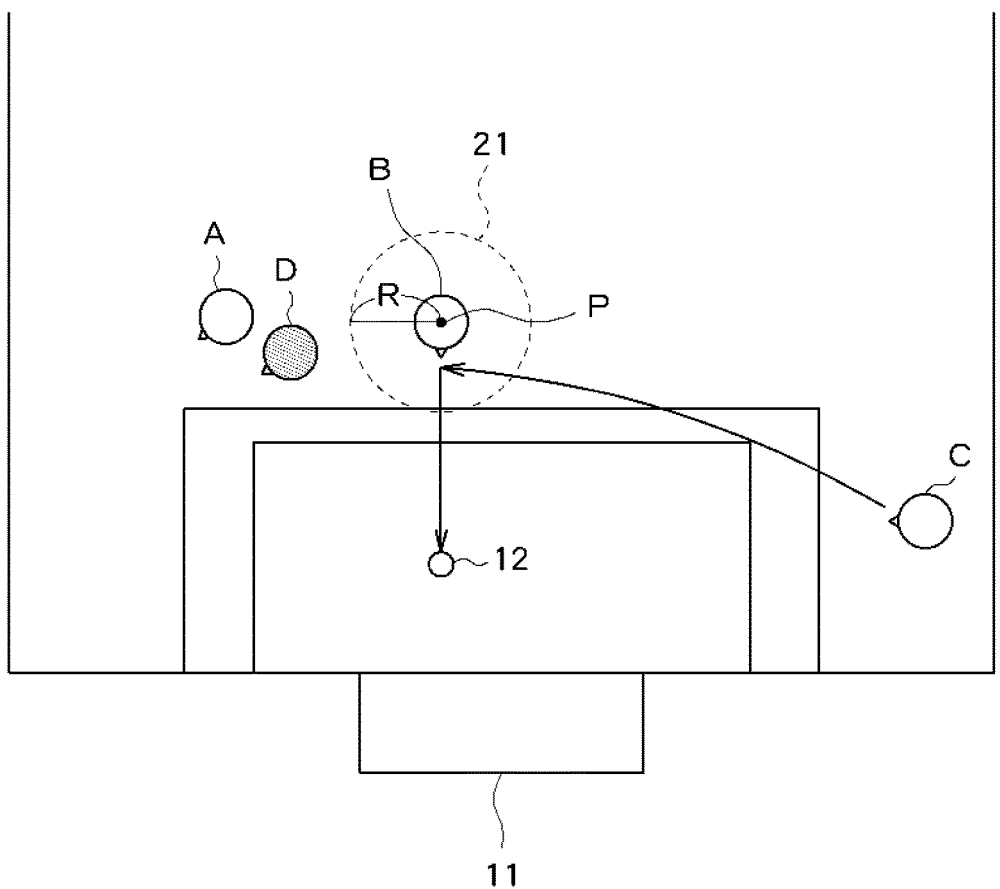
FIG. 9 is a diagram useful for description of the specific action (first dummy action)

FIGS. 7 to 9 are diagrams useful for description of a case where the dummy action is performed in the soccer game. FIG. 7 is the diagram illustrating a state of the pitch before the dummy action is performed. FIG. 8 is the diagram illustrating a state of the pitch while the dummy action is being performed. FIG. 9 is the diagram illustrating a state of the pitch after the dummy action has been performed. As illustrated in FIGS. 7 to 9, located in the pitch are an operation subject object A, an operation subject object B, an operation subject object C, and an opponent object D. The operation subject object A is the marking subject of the opponent object D. In the state illustrated in FIG. 7, the operation subject object A and the opponent object D are positioned in front of the goal object 11 of the opposing team, the operation subject object B is positioned behind the opponent object D, and the operation subject object C is positioned on the left facing toward the goal object 11.

In the case illustrated in FIG. 7, if the operation subject object C is about to kick the ball object 12 toward an area in front of the goal object 11, the operation subject object A performs the dummy action in order to cause the opponent object D to move away from the area in front of the goal object 11. In other words, as illustrated in FIG. 8, the operation subject object A starts to move in a rightward direction facing toward the goal object 11. In addition, the opponent object D that is monitoring the operation subject object A also starts to move in the rightward direction facing toward the goal object 11 in accordance with the operation subject object A. As a result, a space free of the opponent object D is created in front of the goal object 11. In addition, the operation subject object B starts to move toward the space created in front of the goal object 11 in order to make a shot.

Then, as illustrated in FIG. 9, the operation subject object B performs the shooting action without the opponent object D nearby.

Here, detailed description is given of the state of the pitch in which the dummy action is performed with reference to FIGS. 7 to 9. Here, attention is focused on the determination region 21 of the predetermined range including the position P in which the operation subject object B made a shot. Here, the determination region 21 is set as a region of the concentric circle having a radius of R with the position P as its center. Note that the determination region 21 is indicated by the dotted lines in FIGS. 7 to 9.

In the case where attention is focused on the determination region 21, as illustrated in FIG. 9, a state in which the opponent object D is not present inside the determination region 21 was realized at a time at which the operation subject object B (in other words, reference player object) performed the shooting action (in other words, reference time). In other words, the same state as State 1 described above was realized at the reference time.

Further, as illustrated in FIG. 7, the state in which the opponent object D is positioned inside the determination region 21 was realized at a time before the operation subject object A performs the dummy action. In other words, the same state as State 2 described above was realized at the time earlier than the reference time.

Further, as illustrated in FIG. 8, the opponent object D moved in accordance with the movement of the operation subject object A at least at the "time immediately before the opponent object D moved from inside the determination region to outside the determination region", and hence it is understood that the state inside the determination region 21 changed from State 2 to State 1. In other words, the operation subject object A was set at the "time immediately before the opponent object D moved from inside the determination region to outside the determination region" as the marking subject of the opponent object D, and hence it is understood that the state inside the determination region 21 changed from State 2 to State 1. Therefore, in the case where the dummy action was performed, the same state as State 3 described above was realized at least at the "time immediately before the opponent object D moved from inside the determination region to outside the determination region".

As described above, in a case where the dummy action was performed by the operation subject object A, it is possible to confirm all of the facts that: State 1 was realized at the reference time; State 2 was realized at the time earlier than the reference time; and State 3 was realized at least at the "time immediately before the opponent object D moved from inside the determination region to outside the determination region". Therefore, if it can be confirmed that those states were all realized at the respective times, it is highly possible that the dummy action may be performed by the operation subject object 10. Then, if it can be confirmed that those states were all realized at the respective times, the action determining section 48 is configured to determine that the dummy action was performed by the operation subject object 10 (precisely, the marking subject of the noted opponent object).

Note that when determining whether or not a ball-related action (for example, passing action) was performed by the operation subject object 10, the action determining section 48 determines whether or not the ball-related action was performed by the operation subject object 10 based on motion data of each of the operation subject objects 10 being reproduced at each time. For example, if passing motion data was being reproduced for the operation subject player object 10, it is determined that the passing action was performed by the operation subject object 10.

The playback video output section 50 (output means) is implemented mainly by the microprocessor and the image processing section. Based on the reproduction data acquired by the reproduction data acquiring section 46, the playback video output section 50 outputs the playback video of the game space during the reproduction subject period on the monitor. Specifically, the playback video output section 50 reproduces the reproduction data. Here, the phrase "reproducing the reproduction data" refers to sequentially displaying images indicating the state in which the game space is viewed from the virtual camera 18, based on the game situation data (for example, position and viewing direction of the virtual camera 18, position information, posture information, and direction information on each player object, and position information on the ball object 12) obtained at the respective times included in the reproduction data.

In addition, the playback video output section 50 performs an output based on the determination result of whether or not the dummy action was performed by the operation subject object 10 in association with the outputting of the playback video. Here, the above-mentioned "output based on the determination result" refers to the output of an evaluation value determined by the action determining section 48 based on the above-mentioned determination result. In addition, the phrase "performing the output of the evaluation value in association with the outputting of the playback video" means that the outputting of the playback video triggers the outputting of the evaluation value. For example, the phrase means that the evaluation value is output during a period over which the playback video is being output, that the evaluation value is output immediately before the start of the playback video, or that the evaluation value is output immediately after the end of the playback video.

Figure 10:
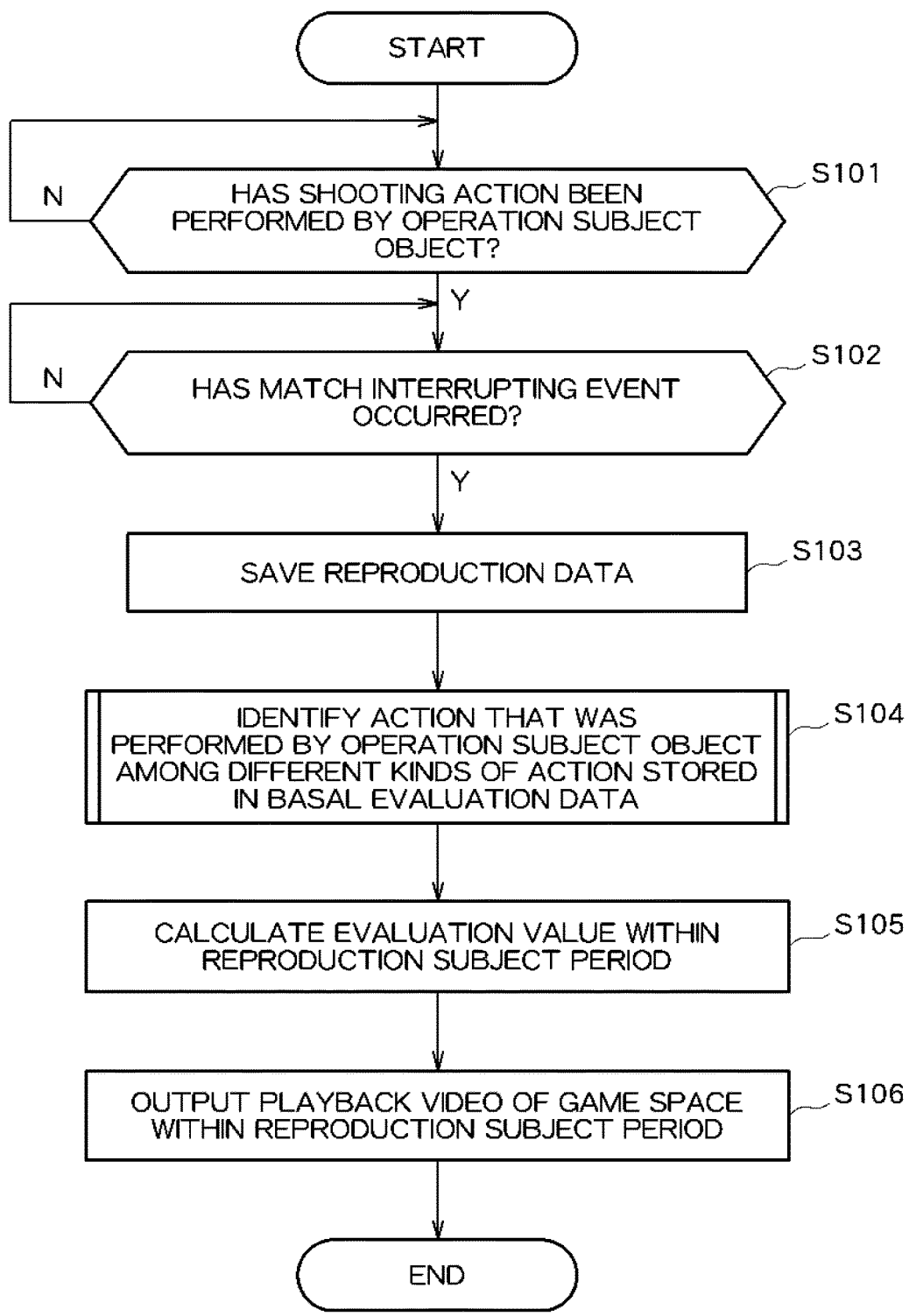
FIG. 10 is a flowchart of processing executed by the game device according to the embodiment of the present invention.

FIG. 10 is a flowchart mainly illustrating processing related to the present invention among the processing executed by each of the game devices 4. The microprocessor executes the processing illustrated in FIG. 10 according to the program stored on the optical disk.

The microprocessor (judgment means) judges whether or not the shooting action has been performed by any one of the operation subjects object 10 every predetermined time (S101). Then, if the shooting action has been performed by the operation subject object 10 (Y in S101), the microprocessor monitors the occurrence of the match interrupting event during the above-mentioned monitoring period (S102).

Then, if the match interrupting event has occurred during the monitoring period (Y in S102), the microprocessor (reproduction data acquiring means) reads and acquires the "game situation data obtained every predetermined time (for example, ¹⁄₆₀th of a second) within the reproduction subject period" which is stored in the main memory, and saves the game situation data as the reproduction data (S103).

Then, the microprocessor references the reproduction data and determines whether or not each of the different kinds of action stored in the basal evaluation data was performed by the operation subject object 10, thereby identifying the action performed by the operation subject object 10 among the above-mentioned different kinds of action (S104).

For example, when determining whether or not the ball-related action was performed by the operation subject object 10, the microprocessor references the reproduction data to determine whether or not the ball-related action was performed by the operation subject object 10 based on the motion data of each of the operation subject objects 10 being reproduced at each time. For example, if the passing motion data was being reproduced for the operation subject object 10, it is determined that the passing action was performed by the operation subject object 10.

Figure 11:
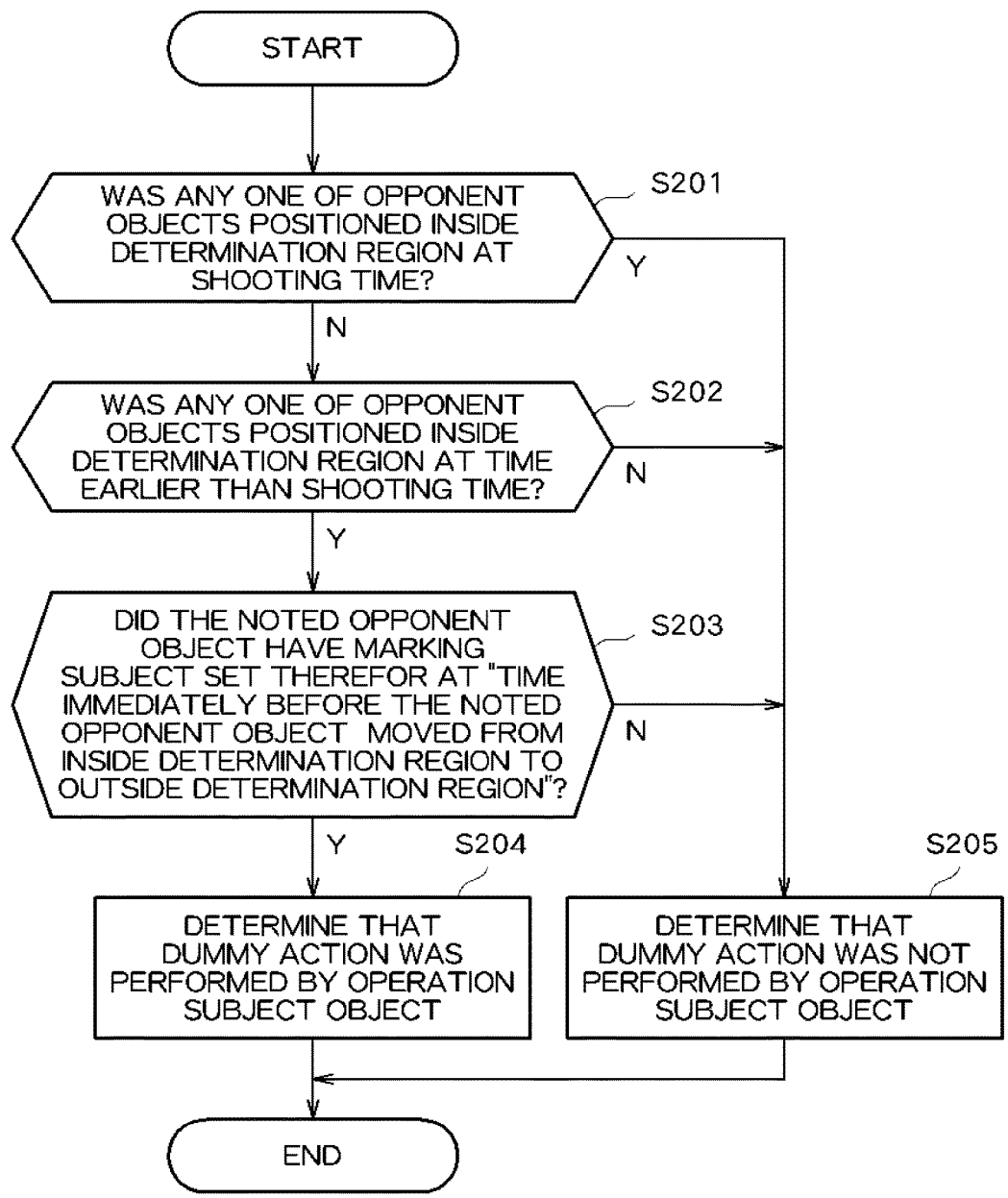
FIG. 11 is a flowchart of processing executed by the game device according to the embodiment of the present invention.

Further, for example, when determining whether or not the dummy action was performed by the operation subject object 10, the microprocessor (determination means) executes processing of a flowchart illustrated in FIG. 11.

In other words, the microprocessor (first determination means) sets as the determination region 21 the concentric circle having a radius of R with the position P at a shooting time (in other words, reference time) at which the shooting action was performed by the operation subject object 10 (in other words, reference player object) that performed the shooting action (in other words, reference action) as its center (see FIGS. 7 to 9), and references the reproduction data and determines whether or not any one of the opponent objects 16 was positioned inside the determination region 21 at the shooting time (S201). If any one of the opponent objects 16 was positioned inside the determination region 21 at the shooting time (Y in S201), the microprocessor determines that the dummy action was not performed by the operation subject object 10 (S205).

Meanwhile, if none of the opponent objects 16 was positioned inside the determination region 21 at the shooting time (N in S201), the microprocessor (second determination means) references the reproduction data and determines whether or not any one of the opponent objects 16 was positioned inside the determination region 21 at a time earlier than the shooting time (S202). If none of the opponent objects 16 was positioned inside the determination region 21 at the time earlier than the shooting time (N in S202), the microprocessor determines that the dummy action was not performed by the operation subject object 10 (S205).

Meanwhile, if any one of the opponent objects 16 was positioned inside the determination region 21 at the time earlier than the shooting time (Y in S202), the microprocessor (third determination means) references the reproduction data and determines whether or not the opponent object 16 positioned inside the determination region 21 at the time earlier than the shooting time (hereinafter, noted opponent object) had the marking subject set therefor at the "time immediately before the noted opponent object moved from inside the determination region 21 to outside the determination region 21" (S203). If the noted opponent object had no marking subject set therefor at the "time immediately before the noted opponent object moved from inside the determination region 21 to outside the determination region 21" (N in S203), the microprocessor determines that the dummy action was not performed by the operation subject object 10 (S205).

Meanwhile, if the noted opponent object had the marking subject set therefor at the "time immediately before the noted opponent object moved from inside the determination region 21 to outside the determination region 21" (Y in S203), the microprocessor determines that the dummy action was performed by the operation subject object 10 (more precisely, operation subject object 10 set as the marking subject of the noted opponent object) (S204). Accordingly, the microprocessor determines whether or not the dummy action was performed by the operation subject object 10.

Once the action performed by the operation subject object 10 is thus identified, the microprocessor (evaluation means) references the basal evaluation data and calculates the evaluation value within the reproduction subject period based on the basal evaluation value corresponding to the action performed by the operation subject object 10 (S105). Note that the microprocessor may determine the evaluation value so that the larger the number of operation subject objects 10 that performed the ball-related action is, the larger the evaluation value becomes. Further, the microprocessor may determine the evaluation value so that the evaluation value becomes larger in a case where the scoring event for the operation subject team occurred after the shooting action than in a case where the scoring event for the operation subject team did not occur after the shooting action.

Then, the microprocessor (output means) reproduces the reproduction data to thereby output the playback video of the game space within the reproduction subject period on the monitor (S106). In addition, the microprocessor (output means) outputs the evaluation value calculated in Step S105 on the monitor during the period over which the playback video is being output (see FIG. 4).

Described above are the contents of the processing performed by each of the game devices 4. According to the game device 4, it becomes possible to discriminate types of action performed by the game character in more detail. As a result, for example, it becomes possible to determine whether or not a moving action for "letting another game character perform the shooting action without any obstructions by opponent game characters", in other words the dummy action, was performed by the game character. Accordingly, it also becomes possible to improve precision of evaluation of the action performed by the game character.

Note that the specific action is not limited to the dummy action described above. For example, in actual soccer, in order to let the player functioning as a forward with an opponent player nearby make a shot without any obstructions by the opponent player, it is necessary to move the opponent player away from the player functioning as the forward. Then, in order to move the opponent player away from the player functioning as the forward, another player often performs the "dummy action" of making such a move as to attract the opponent player. Hereinafter, description is given of another aspect (hereinafter, second embodiment) in which it is determined whether or not the dummy action was performed by the operation subject object 10. Note that hereinafter, the dummy action described with reference to FIGS. 7 to 9 is referred to as a first dummy action, while the dummy action described here is referred to as a second dummy action. Also in the second embodiment, the reference time is assumed to be the time of an action at which the reference player object performed the reference action, and the reference action is assumed to be the shooting action.

Also in the second embodiment, in the same manner as in the first embodiment, when determining whether or not the second dummy action was performed by the operation subject object 10, the action determining section 48 (first determination means) determines whether or not State 1 described above was realized at the reference time. In addition, the action determining section 48 (second determination means) determines whether or not State 2 was realized at the time earlier than the reference time. In addition, the action determining section 48 (third determination means) determines whether or not State 3 was realized at least at the "time immediately before the noted opponent object moved from inside the determination region to outside the determination region". Then, also in the second embodiment, the action determining section 48 determines that the second dummy action was performed by the operation subject object 10 (precisely, the marking subject of the noted opponent object) if it is possible to confirm all of the following facts, that: State 1 was realized at the reference time; State 2 was realized at the time earlier than the reference time; and State 3 was realized at least at the "time immediately before the noted opponent object moved from inside the determination region to outside the determination region".

The determination region is fixed in the first embodiment, but in the second embodiment, the range of the determination region may be changed at the respective times. Specifically, in the second embodiment, the range of the determination region is defined at each time based on the position of the operation subject object 10 that performed the reference action (in other words, reference player object) at each time. For example, in the second embodiment, the range of the determination region at each time is a region having a predetermined range including the position of the operation subject object 10 that performed the reference action at each time. For example, the range of the determination region at each time is the region of the concentric circle having a radius of R with the position of the reference player object at each time as its center.

Here, description is made of a reason that also in the second embodiment, the action determining section 48 determines that the dummy action was performed if it is possible to confirm all of the facts that: State 1 described above was realized at the reference time; State 2 described above was realized at the time earlier than the reference time; and State 3 described above was realized at least at the "timing immediately before the noted opponent object moved from inside the determination region to outside the determination region".

Figure 12:
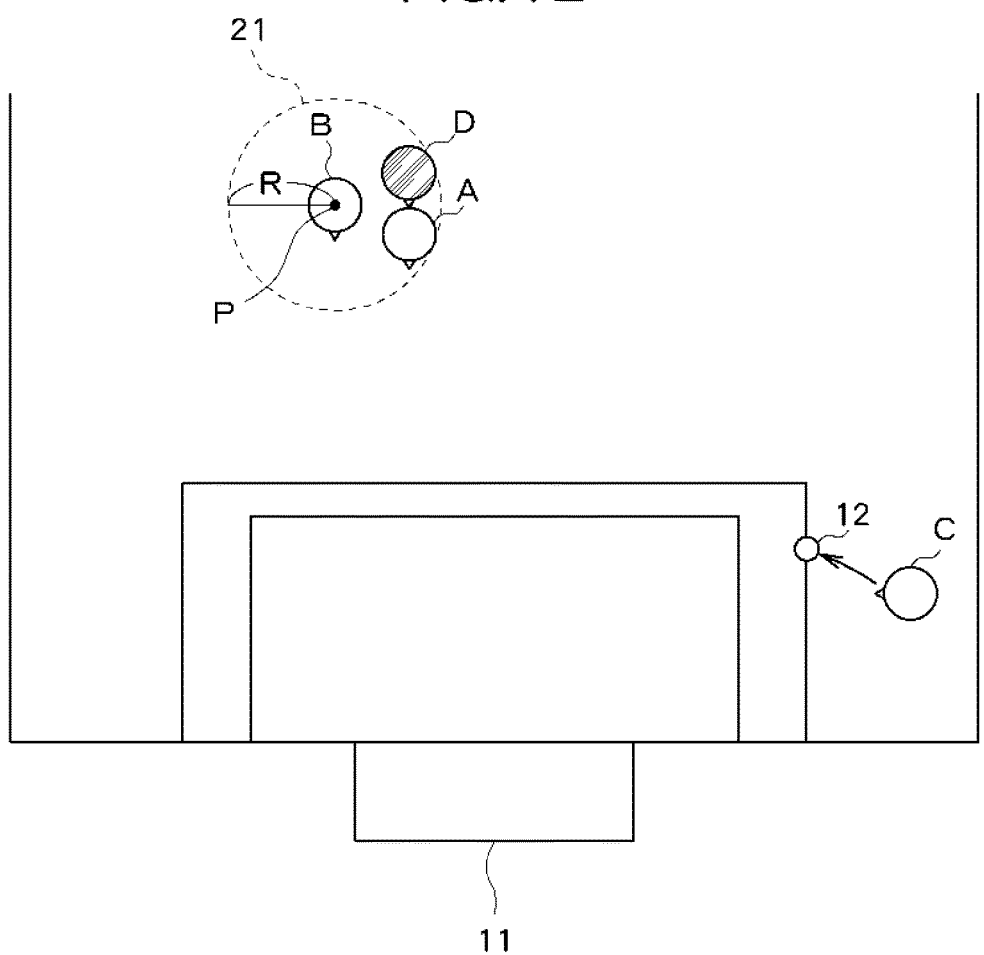
FIG. 12 is a diagram useful for description of a specific action (second dummy action)
Figure 13:
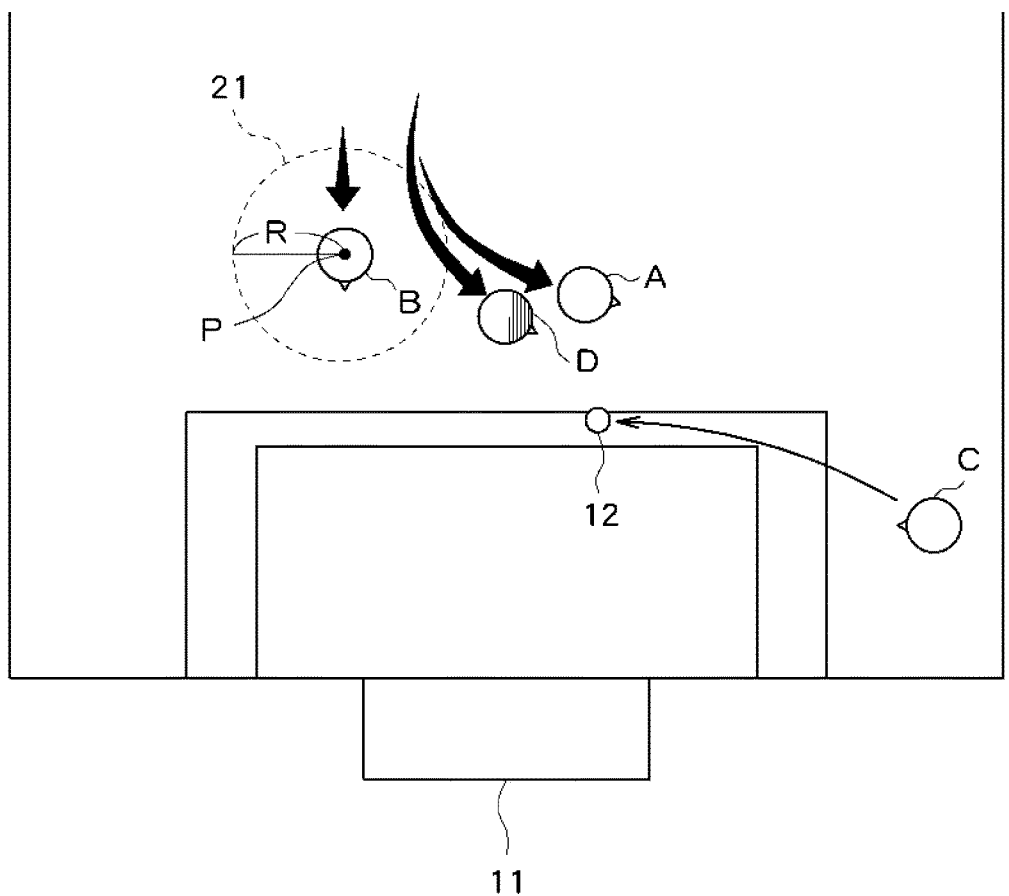
FIG. 13 is a diagram useful for description of the specific action (second dummy action)
Figure 14:
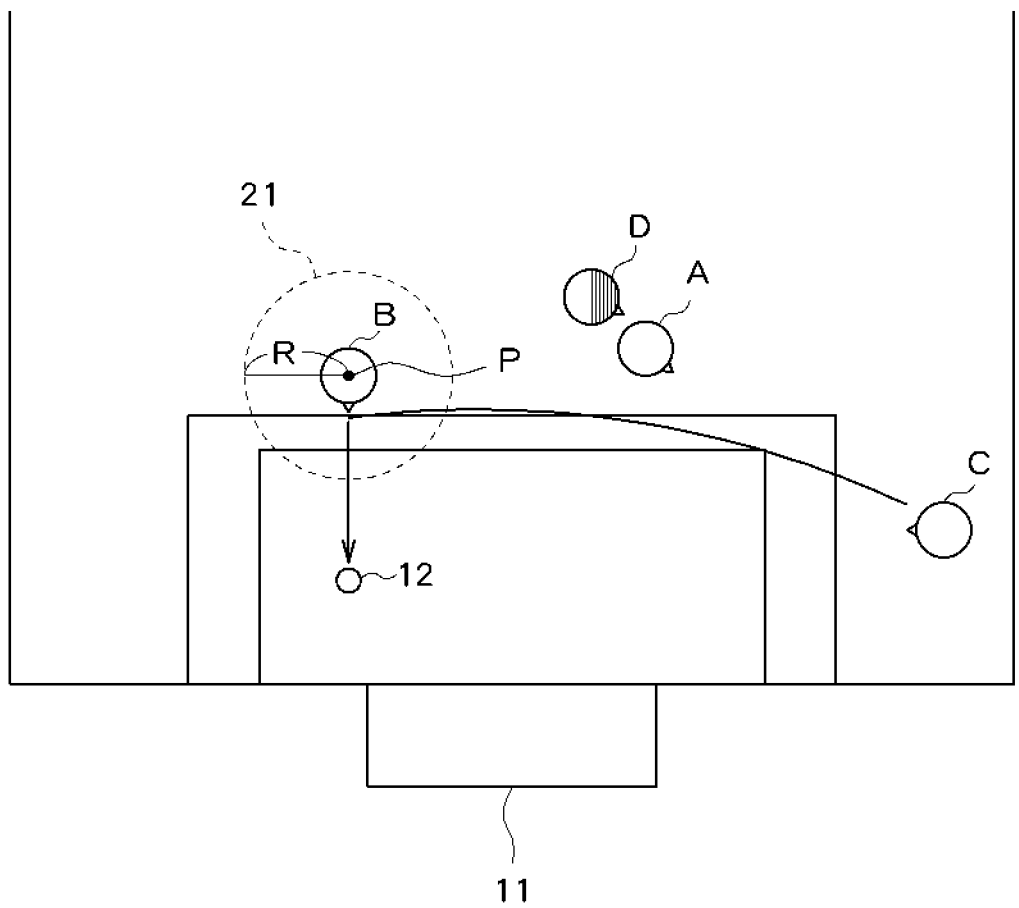
FIG. 14 is a diagram useful for description of the specific action (second dummy action)

FIGS. 12 to 14 are diagrams useful for description of a case where the second dummy action is performed in the soccer game. FIG. 12 is the diagram illustrating a state of the pitch before the second dummy action is performed. FIG. 13 is the diagram illustrating a state of the pitch while the second dummy action is being performed. FIG. 14 is the diagram illustrating a state of the pitch after the second dummy action has been performed. As illustrated in FIGS. 12 to 14, located in the pitch are an operation subject object A, an operation subject object B, an operation subject object C, and an opponent object D. Note that the operation subject object A is the marking subject of the opponent object D.

In the case illustrated in FIG. 12, if the operation subject object C is about to kick the ball object 12 toward an area in front of the goal object 11, as illustrated in FIG. 13, the operation subject object B (in other words, reference player object) starts to move toward the goal object 11 in order to make a shot. Meanwhile, the operation subject object A performs the second dummy action in order to move the opponent object D away from the operation subject object B. In other words, the operation subject object A starts to move in a direction different from the operation subject object B, and the opponent object D that is monitoring the operation subject object A also starts to move in the direction different from the operation subject object B in accordance with the operation subject object A. As a result, the opponent object D is caused to move away from the operation subject object B.

Then, as illustrated in FIG. 14, the operation subject object B performs the shooting action without the opponent (in other words, opponent object D) nearby.

Here, detailed description is made of the state of the pitch in which the second dummy action is performed with reference to FIGS. 12 to 14. Here, unlike the case where the first dummy action is performed, the region of the predetermined range including the position P of the operation subject object B at each time is brought into attention as the determination region 21. Here, the determination region 21 at each time is set as the region of the concentric circle having a radius of R with the position P of the operation subject object B at the each time as its center. Note that in FIGS. 12 to 14, a region surrounded by the dotted lines indicates the determination region 21.

In FIG. 14, in the case where attention is focused on the determination region 21, a state in which the opponent object D is not present inside the determination region 21 was realized at a time at which the operation subject object B (reference player object) performed the shooting action (in other words, reference time). In other words, the same state as State 1 described above was realized at the reference time.

Further, as illustrated in FIG. 12, the state in which the opponent object D is positioned inside the determination region 21 was realized at a time before the operation subject object A performs the second dummy action. In other words, the same state as State 2 described above was realized at the time earlier than the reference time.

Further, as illustrated in FIG. 13, the opponent object D moved at least at the "time immediately before the opponent object D moved from inside the determination region to outside the determination region" in accordance with the movement of the operation subject object A, and hence it is understood that the state inside the determination region 21 changed from State 2 to State 1. In other words, the operation subject object A was set as the marking subject of the opponent object D at least at the "time immediately before the opponent object D moved from inside the determination region to outside the determination region", and hence it is understood that the state inside the determination region 21 changed from State 2 to State 1. Therefore, in the case where the second dummy action was performed, the same state as State 3 described above was realized at least at the "time immediately before the opponent object D moved from inside the determination region to outside the determination region".

As described above, also in the second embodiment, in a case where the second dummy action performed by the operation subject object A, it is possible to confirm all of the facts, that: State 1 was realized at the reference time; State 2 was realized at the time earlier than the reference time; and State 3 was realized at least at the "time immediately before the opponent object D moved from inside the determination region to outside the determination region". Therefore, if it can be confirmed that those states were all realized at the respective times, it is highly possible that the second dummy action may be performed by the operation subject object 10. Then, if it can be confirmed that those states were all realized at the respective times, the action determining section 48 determines that the second dummy action was performed by the operation subject object 10 (precisely, the marking subject of the noted opponent object).

Here, in this second embodiment, description is given of processing executed by the microprocessor in order to determine whether or not the second dummy action was performed by the operation subject object 10 by referring to FIG. 11. Note that this processing is performed in Step S104 illustrated in FIG. 10 in the same manner as the first embodiment.

In the second embodiment, in Step S201, the microprocessor (first determination means) references the reproduction data and determines whether or not the opponent object 16, being a predetermined distance R or less from the operation subject object (in other words, reference player object) that performed the shooting action (in other words, reference action), existed at the shooting time (in other words, reference time) at which the shooting action was performed by the operation subject object 10. Then, if the opponent object 16 that was the predetermined distance R or less from the operation subject object 10 that performed the shooting action existed at the shooting time (Y in S201), the microprocessor determines that the second dummy action was not performed by the operation subject object 10 (S205).

Meanwhile, if the opponent object 16 that was the predetermined distance R or less from the operation subject object 10 that performed the shooting action did not exist at the shooting time (N in S201), the microprocessor (second determination means) determines whether or not the opponent object 16 that was the predetermined distance R or less from the operation subject object 10 that performed the shooting action existed at the time earlier than the shooting time (S202). Then, if no opponent object 16 that was the predetermined distance R or less from the operation subject object 10 that performed the shooting action existed at the time earlier than the shooting time (N in S202), the microprocessor determines that the second dummy action was not performed by the operation subject object 10 (S205).

Meanwhile, if the opponent object 16 that was the predetermined distance R or less from the operation subject object 10 that performed the shooting action existed at the time earlier than the shooting timing (Y in S202), the microprocessor (third determination means) determines whether or not the opponent object 16 that was the predetermined distance R or less from the operation subject object 10 that performed the shooting action at the time earlier than the shooting timing (hereinafter, noted opponent object) had the marking subject set therefor at a "time immediately before the distance between the operation subject object 10 that has performed the shooting action and the noted opponent object became larger than the predetermined distance R" (S203). If the noted opponent object had no marking subject set therefor at the "time immediately before the distance between the operation subject object that has performed the shooting action and the noted opponent object became larger than the predetermined distance R" (N in S203), the microprocessor determines that the second dummy action was not performed by the operation subject object 10 (S205).

Meanwhile, if the noted opponent object had the marking subject set therefor at the "time immediately before the distance between the operation subject object that has performed the shooting action and the noted opponent object became larger than the predetermined distance R" (Y in S203), it is determined that the second dummy action was performed by the operation subject object 10 (S204). Accordingly, the microprocessor determines whether or not the second dummy action was performed by the operation subject object 10.

As described above, according to the game device 4, it is possible to determine whether or not the second dummy action was performed by the game character. Therefore, also in the second embodiment, it becomes possible to discriminate the types of action performed by the game character in more detail.

Further, the specific action is not limited to the dummy action described above. For example, in actual soccer, in order to let the player functioning as the forward make a shot without any obstructions by opponent players, another player often performs a "screening action" of blocking the opponent player that is about to move toward the player functioning as the forward, or the opponent player that is about to move toward the front of the goal. Hereinafter, description is made of another aspect (hereinafter, third embodiment) in which it is determined whether or not the screening action was performed by the operation subject object 10. Note that also here, the reference time is assumed to be the time of an action at which the reference player object performed the reference action, and the reference action is assumed to be the shooting action.

Also in the third embodiment, in the same manner as in the first embodiment, to determine whether or not the specific action was performed by the operation subject object 10, the action determining section 48 (first determination means) determines whether or not State 1 described above was realized at the reference time.

However, in the third embodiment, in order to determine whether or not the operation subject object 10 other than the reference player object became the cause of realizing State 1 described above at the reference time, the action determining section 48 (second determination means) references the reproduction data and determines whether or not the opponent object 16 that was moving toward the determination region 21 or the reference player object collided with the operation subject object 10 other than the reference player object outside the determination region 21 at the time earlier than the reference time.

In this embodiment, the action determining section 48 references the reproduction data and determines whether or not a collision between the opponent object 16 and any one of the operation subject objects 10 (hereinafter, referred to as "operation subject object X") other than the reference player object occurred outside the determination region 21 at the time earlier than the reference time. In addition, if the collision between the opponent object and the operation subject object X occurred outside the determination region 21 at the time earlier than the reference time, the action determining section 48 determines whether or not the opponent object 16 that collided with the operation subject object X (hereinafter, referred to as "noted opponent object") had been moving toward the determination region 21 or the reference player object before colliding with the operation subject object X. Here, the action determining section 48 determines whether or not the noted opponent object was moving toward the determination region 21 or the reference player object at least at the "time immediately before the noted opponent object collided with the operation subject object X".

Then, in the case where State 1 described above was realized at the reference time, the action determining section 48 determines that, if the noted opponent object was moving toward the determination region 21 or the reference player object at least at the "time immediately before the noted opponent object collided with the operation subject object X", the screening action was performed by the operation subject object 10 (precisely, operation subject object X that collided with the noted opponent object).

As described above, the action determining section 48 determines that the screening action was performed by the operation subject object X if it is possible to confirm all of the following facts, that: State 1 described above was realized at the reference time; a "state in which the collision between the opponent object 16 and the operation subject object 10 (in other words, operation subject object X) other than the reference player object occurred outside the determination region 21" (State 2) was realized at the time earlier than the reference time; and a "state in which the noted opponent object was moving toward the determination region 21 or the reference player object" (State 3) was realized at least at the "time immediately before the noted opponent object collided with the operation subject object X.

Here, description is given of a reason why the action determining section 48 determines that the screening action was performed if it is possible to confirm all of the facts that:

State 1 described above was realized at the reference time; State 2 described above was realized at the time earlier than the reference time; and State 3 described above was realized at least at the "time immediately before the noted opponent object collided with the operation subject object X".

Figure 15:
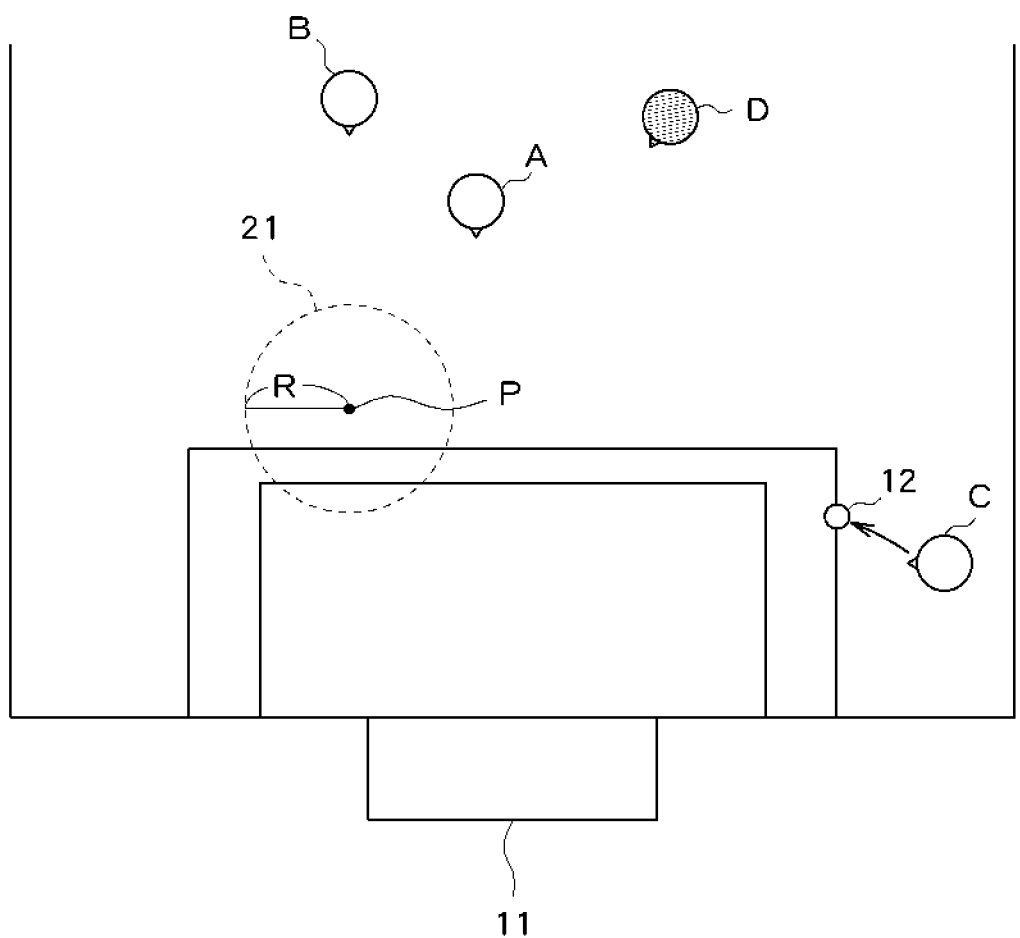
FIG. 15 is a diagram useful for description of a specific action (screening action)
Figure 16:
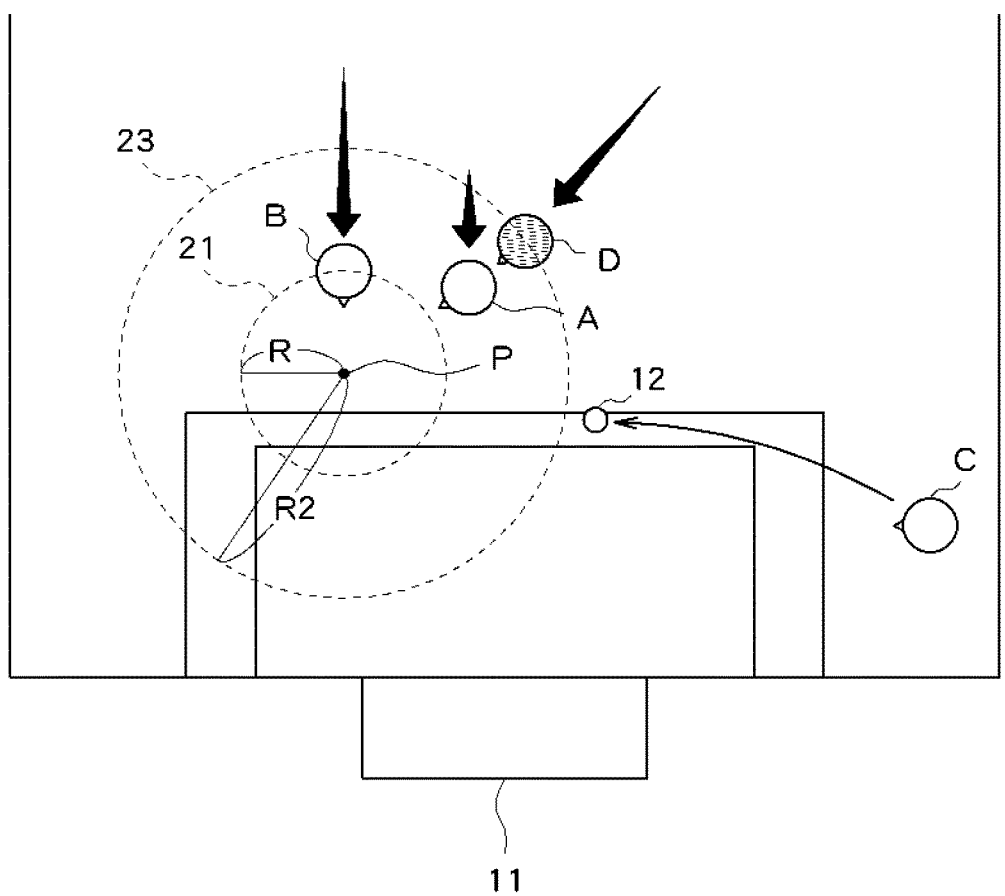
FIG. 16 is a diagram useful for description of the specific action (screening action)
Figure 17:
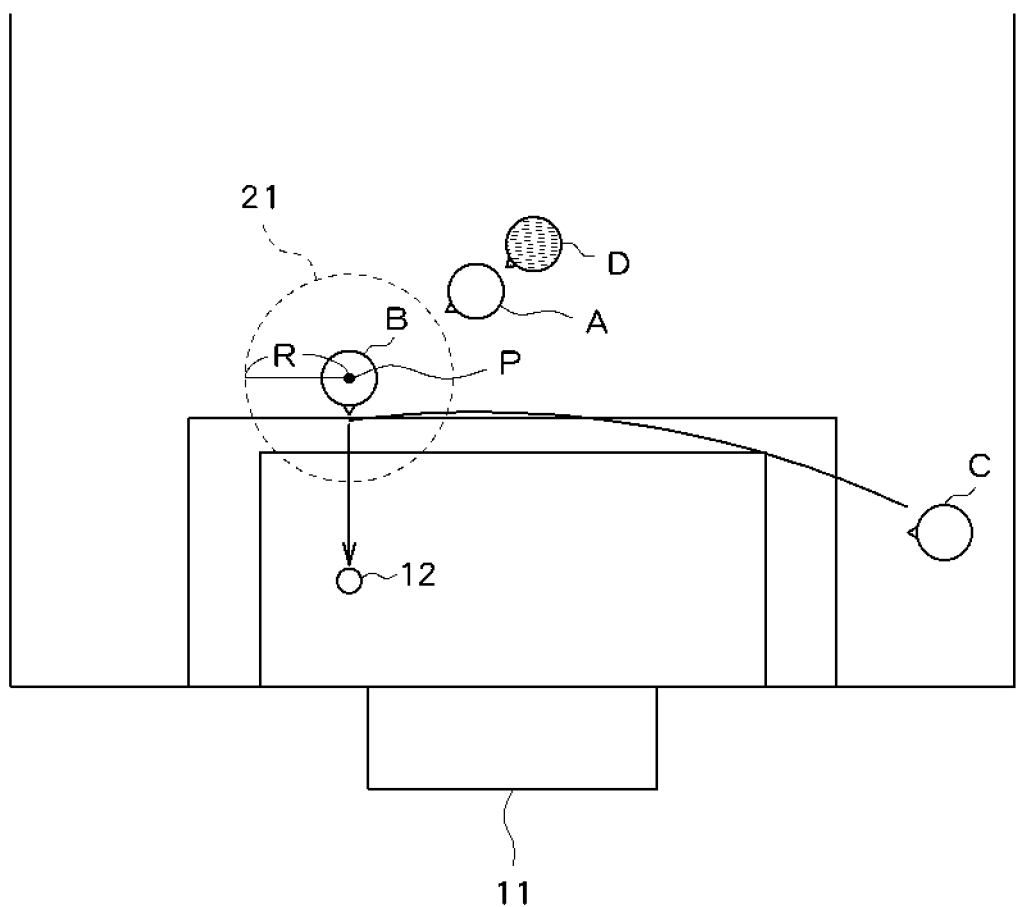
FIG. 17 is a diagram useful for description of the specific action (screening action)

FIGS. 15 to 17 are diagrams useful for description of a case where the screening action is performed in the soccer game. FIG. 15 is the diagram illustrating a state of the pitch before the screening action is performed. FIG. 16 is the diagram illustrating a state of the pitch while the screening action is being performed. FIG. 17 is the diagram illustrating a state of the pitch after the screening action has been performed. As illustrated in FIGS. 15 to 17, located in the pitch are the operation subject object A, the operation subject object B, the operation subject object C, and the opponent object D. In the state illustrated in FIG. 15, the operation subject object A, the operation subject object B, and the opponent object D are positioned in front of the goal object 11 of the opposing team, and the operation subject object C is positioned on the left facing toward the goal object 11.

In the case illustrated in FIG. 15, the operation subject object C attempts to kick the ball object 12 toward a space in front of the goal object 11 in order to let the operation subject object B (in other words, reference player object) make a shot. Then, as illustrated in FIG. 16, the operation subject object B starts to move toward the above-mentioned space in order to shoot the ball object 12. When the operation subject object B starts to move toward the above-mentioned space, as illustrated in FIG. 16, the opponent object D starts to move toward the operation subject object B or the above-mentioned space in order to hinder the operation subject object B from shooting the ball object 12. Described here is a case where the opponent object D is starting to move toward the above-mentioned space. Further, the operation subject object A performs the screening action of blocking a moving path of the opponent object D in order to prevent the opponent object D from reaching the operation subject object B or the above-mentioned space. In other words, the operation subject object A starts to move in front of the opponent object D. As a result, as illustrated in FIG. 16, the operation subject object A and the opponent object D collide with each other.

The collision between the operation subject object A and the opponent object D has restricted the movement of the opponent object D for a fixed time, and hence as illustrated in FIG. 17, the operation subject object B performs the shooting action without the opponent object D nearby.

Here, detailed description is given of the state of the pitch in the case where the screening action is performed with reference to FIGS. 15 to 17. Here, attention is focused on the determination region 21 of the predetermined range including the position P in which the operation subject object B made a shot. Here, the determination region 21 is set as the region of the concentric circle having a radius of R with the position P as its center. Further, in the third embodiment, the attention is focused on not only the determination region 21 but also a second determination region 23. The second determination region 23 is a region of a predetermined range set outside the determination region 21. Here, the second determination region 23 is set as a region outside the determination region 21 within a region of a concentric circle having a radius of R2 (R2>R) with the position P as its center. Note that the determination region 21 is indicated by the dotted lines in FIGS. 15 to 17. The second determination region 23 is indicated by the dotted lines in FIG. 16.

In the case where attention is focused on the determination region 21, as illustrated in FIG. 17, the state in which the opponent object D is not present inside the determination region 21 was realized at the time (in other words, reference time) at which the operation subject object B (in other words, reference player object) performed the shooting action. In other words, the same state as State 1 described above was realized at the reference time.

Further, as illustrated in FIG. 16, the state in which the opponent object D and the operation subject object A (in other words, operation subject object X) other than the operation subject object B that has performed the shooting action collided with each other in the second determination region 23 was realized at a time before the time (in other words, reference time) at which the operation subject object B performs the shooting action. In other words, the same state as State 2 described above was realized at the time earlier than the reference time.

Further, as illustrated in FIG. 16, at a time immediately before the collision between the opponent object D (in other words, noted opponent object) and the operation subject object A occurred, the opponent object D was moving toward the determination region 21 or the operation subject object B (in other words, reference player object). In other words, the same state as State 3 described above was realized at a "time immediately before the opponent object D collided with the operation subject object A".

As described above, in a case where the screening action was performed by the operation subject object A, it is possible to confirm all of the facts that: State 1 described above was realized at the reference time; State 2 described above was realized at the time earlier than the reference time; and State 3 described above was realized at least at the "time immediately before the opponent object D collided with the operation subject object A". Therefore, if it can be confirmed that those states were all realized at the respective times, it is highly possible that the screening action may be performed by the operation subject object 10. Then, in the third embodiment, if it can be confirmed that those states were all realized, the action determining section 48 determines that the screening action was performed by the operation subject object 10 (precisely, operation subject object X that collided with the noted opponent object).

Here, in this third embodiment, description is given of processing executed in order for the microprocessor to determine whether or not the screening action was performed by the operation subject object 10 by referring to FIG. 11. Note that this processing is performed in Step S104 illustrated in FIG. 10 in the same manner as the first embodiment.

In the third embodiment, the microprocessor sets as the determination region 21 the concentric circle having a radius of R with the position P, where the shooting action (in other words, reference action) was performed by the operation subject object 10 (in other words, reference player object) at the shooting time (in other words, reference time), as its center (see FIGS. 15 to 17). In addition, the microprocessor sets as the second determination region 23 the region outside the determination region 21 within the region of the concentric circle having a radius of R2 (R2>R) with the position P as its center (see FIG. 16). After that, the microprocessor (first determination means) references the reproduction data and determines whether or not any one of the opponent objects 16 was positioned inside the determination region 21 at the shooting time (S201). If any one of the opponent objects 16 was positioned inside the determination region 21 at the shooting time (Y in S201), the microprocessor determines that the screening action was not performed by the operation subject object 10 (S205).

Meanwhile, if none of the opponent objects 16 was positioned inside the determination region 21 at the shooting time (N in S201), in the following Steps S202 and S203, the microprocessor (second determination means) references the reproduction data and performs processing to determine whether or not the opponent object 16 that had been moving toward the determination region, or the operation subject object 10 that performed the shooting action, collided in the second determination region 23 with any one of the operation subject objects 10 (hereinafter, operation subject object X) other than the operation subject object 10 that performed the shooting action at the time earlier than the shooting time.

In other words, the microprocessor references the reproduction data and determines whether or not the collision between the opponent object 16 and the operation subject object X occurred in the second determination region 23 at the time earlier than the shooting time (S202). If the collision between the opponent object 16 and the operation subject object X did not occur in the second determination region 23 at the time earlier than the shooting time (N in S202), the microprocessor determines that the screening action was not performed by the operation subject object 10 (S205).

Meanwhile, if the collision between the opponent object 16 and the operation subject object X occurred in the second determination region 23 at the time earlier than the shooting time (Y in S202), the microprocessor references the reproduction data and determines whether or not the opponent object 16 that collided with the operation subject object X (hereinafter, noted opponent object) was moving toward the determination region 21 or the operation subject object 10 that performed the shooting action at the "time immediately before the noted opponent object collided against the operation subject object X" (S203).

Figure 18:
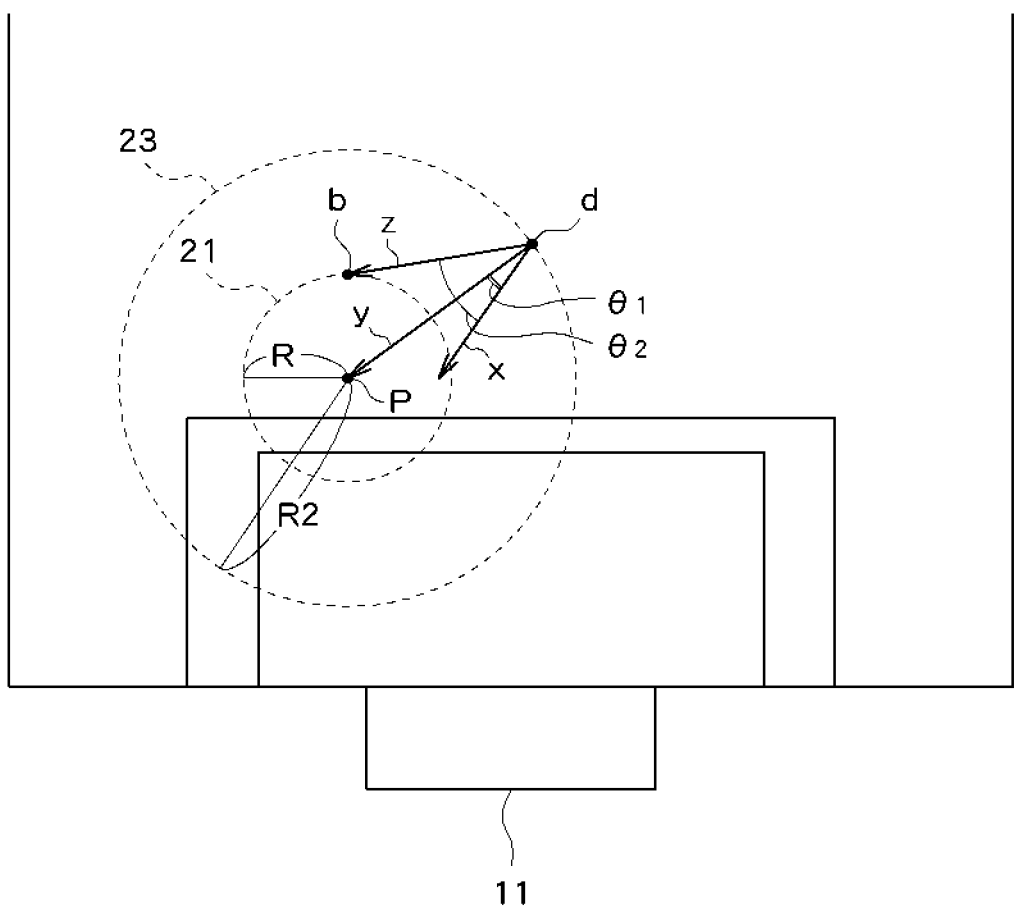
FIG. 18 is a diagram useful for description of processing executed by the game device according to the embodiment of the present invention.

FIG. 18 is a diagram useful for description of an example of a processing of determining whether or not the noted opponent object was moving toward the determination region 21 or the operation subject object 10 that performed the shooting action at the "time immediately before the noted opponent object collided with the operation subject object X". FIG. 18 illustrates an example of a positional relationship between a position b of the operation subject object B, a position d of the opponent object D, and the position P in the case illustrated in FIG. 16. In FIG. 18, the position d indicates the position of the opponent object D at the "time immediately before the opponent object D collided with the operation subject object A", and the position b indicates the position of the operation subject object B at that time. In addition, a vector x represents the moving direction of the opponent object D at that time, a vector y represents a vector that extends from the position d to the position P, and a vector z represents a vector that extends from the position d to the position b. In addition, θ1 represents an angle formed by the vector x and the vector y, and θ2 represents an angle formed by the vector x and the vector z.

In Step S203, to determine whether or not the noted opponent object was moving toward the determination region 21 at the "time immediately before the noted opponent object collided with the operation subject object X", the microprocessor determines whether or not the angle θ1 formed by the moving direction of the noted opponent object at that time, and the direction that extends from the position of the noted opponent object at that time to the position P, fall within a predetermined angle range (for example, 0 degrees to 20 degrees). For example, in the case illustrated in FIG. 18, the microprocessor determines whether or not the angle θ1 formed by the vector x and the vector y falls within the predetermined angle range. If the angle θ1 falls within the above-mentioned predetermined angle range, this means that the noted opponent object was moving toward the determination region 21 at the "time immediately before the noted opponent object collided with the operation subject object 10".

Meanwhile, in Step S203, to determine whether or not the noted opponent object was moving toward the operation subject object 10 that performed the shooting action at the "time immediately before the noted opponent object collided with the operation subject object X", the microprocessor determines whether or not the angle θ2 formed by the moving direction of the noted opponent object at that time and the direction that extends from the position of the noted opponent object at that time to the position of the operation subject object 10 that performed the shooting action at that time falls within the above-mentioned predetermined angle range. For example, in the case illustrated in FIG. 18 the microprocessor determines whether or not the angle θ2 formed by the vector x and the vector z falls within the above-mentioned predetermined angle range. If the angle θ2 falls within the above-mentioned predetermined angle range, this means that the noted opponent object was moving toward the operation subject object 10 that performed the shooting action at the "time immediately before the noted opponent object collided with the operation subject object X". Accordingly, the microprocessor determines whether or not the noted opponent object was moving toward the determination region 21 or the operation subject object 10 that performed the shooting action at the "time immediately before the noted opponent object collided with the operation subject object X".

In addition, if the noted opponent object was not moving toward the determination region 21 nor the operation subject object 10 that performed the shooting action at the "time immediately before the noted opponent object collided with the operation subject object X" (N in S203), the microprocessor determines that the screening action was not performed by the operation subject object 10 (S205).

Meanwhile, if the noted opponent object was moving toward the determination region 21 or the operation subject object 10 that performed the shooting action at the "time immediately before the noted opponent object collided with the operation subject object X" (Y in S203), the microprocessor determines that the screening action was performed by the operation subject object 10 (precisely, operation subject object X that collided with the noted opponent object) (S204).

As described above, according to the game device 4, it is possible to determine whether or not the screening action was performed by the game character. Therefore, also in the third embodiment, it becomes possible to discriminate the types of action performed by the game character in more detail.

Note that in the configuration described above, the microprocessor determines whether or not the opponent object 16 collided with the operation subject object X (S202), and then determines whether or not the opponent object 16 that collided with the operation subject object X had been moving toward the determination region 21 or the operation subject object 10 that performed the shooting action (S203). However, the microprocessor may determine in Step S202 whether or not the opponent object 16 was moving toward the determination region 21 or the operation subject object 10 that performed the shooting action at the time earlier than the shooting time, and then may determine in Step S203 whether or not the opponent object 16 that was moving toward the determination region 21 or the operation subject object 10 that performed the shooting action (hereinafter, noted opponent object) collided, in the second determination region 23, with any one of the operation subject objects 10 other than the operation subject object 10 that performed the shooting action at the time earlier than the shooting time. After that, the microprocessor may determine in Step S204 that the screening action was performed by the operation subject object X if the noted opponent object collided with the operation subject object X other than the operation subject object 10 that performed the shooting action, in the second determination region, at the time earlier than the shooting time.

Note that the present invention is not limited to the above-mentioned embodiments.

For example, in the first embodiment to the third embodiment, in order to indicate to the user that a specific action was performed, the microprocessor may output an arrow image for showing the moving path of the operation subject object 10 that performed the specific action onto the playback video. For example, when the playback video is output in Step S106, as illustrated in FIG. 4, the microprocessor (output means) may display, on the playback video, arrow images 24 for showing the moving paths from a start time of the reproduction subject period of the operation subject object 10 that performed the specific action and the noted opponent object. Note that in FIG. 4, the microprocessor output both the arrow image 24 and the evaluation value 20, but may output only the arrow image 24 instead of the evaluation value 20.

Further, for example, in the first embodiment to the third embodiment, if the specific action was performed by the operation subject object 10, in Step S106 illustrated in FIG. 11, the microprocessor (setting means) may set the virtual camera 18 when outputting the playback video based on the operation subject object 10 that performed the specific action. Hereinafter, description is given of an aspect in which "the virtual camera 18 is set based on the position of the operation subject object 10 that performed the specific action".

In this aspect, for example, the microprocessor, based on the position of the operation subject object 10 that performed the specific action, sets the "viewing direction" of the virtual camera when outputting the playback video. For example, the microprocessor may switch, at a time at which the noted opponent object starts to make their move, the viewing direction of the virtual camera 18 from the direction for viewing the ball object 12 to a direction for viewing the operation subject object 10 that performed the specific action. Note that the microprocessor may switch the viewing direction of the virtual camera 18 to a direction for viewing the noted opponent object instead of the direction for viewing the operation subject object 10 that performed the specific action. Alternatively, for example, the microprocessor may switch, at a time at which the operation subject object 10 that performed the specific action starts to make their move, the viewing direction of the virtual camera 18 from the direction for viewing the ball object 12 to the direction for viewing the operation subject object 10 that performed the specific action. Also in this case, the microprocessor may switch the viewing direction of the virtual camera 18 to a direction for viewing the noted opponent object instead of the direction for viewing the operation subject object 10 that performed the specific action. According to this aspect, for example, a state in which the specific action is being performed can be made to stand out in the playback video. Note that this aspect may be effected instead of the outputting of the evaluation value 20 and the arrow image 24.

Further, for example, if the number of the user objects involved in the movement of the ball object 12 during the reproduction subject period is small, the playback video is likely to be boring for most users. Therefore, the microprocessor may execute the following processing. In other words, the microprocessor (number-of-characters acquiring means) acquires the number of the user objects that performed the ball-related action during the reproduction subject period among the user objects of the respective users. For example, the microprocessor references the reproduction data and counts the number of the user objects that performed the ball-related action. After that, the microprocessor (condition determining means) may determine whether or not the number of the user objects that performed the ball-related action is equal to or larger than a predetermined number, and only if it is determined that the number of the user objects that performed the ball-related action is equal to or larger than the predetermined number (for example, 3), execute Step S106 to output the playback video. Accordingly, only in the case where the number of users that were involved in the movement of the ball object 12 is equal to or larger than the predetermined number, can the playback video be output. As a result, it becomes possible to make most users enjoy themselves.

Further, in the above-mentioned configuration, the microprocessor acquires the reproduction data when the shooting action is performed by the operation subject object 10. However, the microprocessor may acquire the reproduction data irrespective of whether or not the shooting action has been performed by the operation subject object 10. For example, irrespective of whether or not the shooting action has been performed by the operation subject object 10, the microprocessor may acquire the reproduction data each time the match interrupting event occurs. In this case, the microprocessor (judgment means) may reference the reproduction data and judges whether or not the shooting action serving as the reference action was performed during the reproduction subject period, and then if the shooting action was performed by the operation subject object 10 during the reproduction subject period, execute the processing illustrated in FIG. 11.

Further, the reference action is not limited to the shooting action. For example, the "action of receiving a pass" may be the reference action. In this case, the operation subject object 10 that performed the "action of receiving a pass" corresponds to the reference player object, and a time at which the reference player object performed the "action of receiving a pass" becomes the reference time.

Further, for example, the microprocessor may output the playback video as a highlight of a match after the end of the match. In this case, the microprocessor may store a plurality of reproduction data in the main memory, and select a predetermined number of reproduction data to use for the highlight in decreasing order of the evaluation score.

Further, the soccer game is not limited to a game in which a plurality of users join simultaneously, but may be a one-person game.

Further, here, the description is directed to the case where the soccer game is realized in the game system 100, but the game realized in the game system 100 may be a sports game other than the soccer game. For example, in cases of a basketball game, an ice hockey game, a handball game, and a water polo game, the shooting action and the action of receiving a pass correspond to the reference action. Alternatively, for example, in a case of a rugby game, an action of making a try and the action of receiving a pass correspond to the reference action. Alternatively, for example, in a case of an American football game, the action of receiving a pass corresponds to the reference action.

Further, for example, hereinabove, the description is given of the case where each of the game devices includes the reproduction data acquiring section 46 and the action determining section 48, but those functions need not be included in all of the game devices as long as those functions are included in the entire game system 100. For example, only the game device having the server function may include those functions.

Further, in addition to the plurality of game devices 4, the game system 100 may include a game server having the server function. For example, the game system 100 may include the plurality of game devices 4 having the client function and the game server having the server function. Also in this case, only the game server having the server function may include the reproduction data acquiring section 46 and the action determining section 48.

Further, the functional blocks illustrated in FIG. 5 can be implemented not only by the game device 4 of the game system 100 but also by a stand-alone game device.

The invention claimed is:

1. A game system for carrying out a game in which a plurality of game characters perform an action, the plurality of game characters including a plurality of first game characters belonging to a first group and a plurality of second game characters belonging to a second group that opposes the first group, the game system comprising:
   judgment means for judging whether or not a reference action was performed by any one of the plurality of first game characters;
   determination means for determining, when it is judged that the reference action was performed by any one of the plurality of first game characters that is operated by a first user, whether or not a specific action was performed before a reference time by any one of the plurality of first game characters that is other than a reference game character and that is operated by a second user, based on reproduction data, the reference game character being the first game character that performed the reference action at the reference time, the reference time being a time when the reference action was performed by the reference game character, the reproduction data being data for reproducing actions which the plurality of game characters performed on or before the reference time; and
   output means for outputting a playback video based on the reproduction data,
   wherein the determination means comprises:
      a first determination means for determining based on the reproduction data, when it is judged that the reference action was performed by any one of the plurality of first game characters that is operated by the first user, whether or not none of the plurality of second game characters was positioned at the reference time within a vicinity region of the reference game character; and
      a second determination means for determining based on the reproduction data, when it is judged that the reference action was performed by any one of the plurality of first game characters that is operated by the first user and when it is determined by the first determination means that none of the second game characters was positioned at the reference time within the vicinity region of the reference game character, whether or not a state in which none of the second game characters was positioned at the reference time within the vicinity region of the reference game character was realized by any one of the plurality of first game characters that is other than the reference game character and that is operated by the second user, wherein when it is determined by the second determination means that the state was realized by any one of the plurality of first game characters other than the reference game character and that is operated by the second user, the determination means determines that the specific action was performed before the reference time by any one of the plurality of first game characters other than the reference game character and that is operated by the second user, and wherein the output means performs an output based on a determination result by the determination means in association with the outputting of the playback video.

2. A game system according to claim 1,
wherein the second determination means comprises:
means for determining whether or not at least one of the plurality of second game characters was positioned before the reference time within a vicinity region of a reference position, the reference position being a position where the reference game character was positioned at the reference time; and
means for determining, when it is determined that at least one of the plurality of second game characters was positioned before the reference time within the vicinity region of the reference position, whether or not the at least one of the plurality of second game characters moved to outside the vicinity region of the reference position from within the vicinity region of the reference position following the movement of any one of the plurality of first game characters other than the reference game character before the reference time to thereby be positioned at the reference time outside the vicinity region of the reference position;

wherein when it is determined that the at least one of the plurality of second game characters moved to outside the vicinity region of the reference position from within the vicinity region of the reference position following the movement of any one of the plurality of first game characters other than the reference game character before the reference time to thereby be positioned at the reference time outside the vicinity region of the reference position, the second determination means determines that the state was realized by any one of the plurality of first game characters other than the reference game character.

3. A game system according to claim 1,
wherein the second determination means comprises:
means for determining whether or not at least one of the plurality of second game characters was positioned before the reference time within the vicinity region of the reference game character; and
means for determining, when it is determined that at least one of the plurality of second game characters was positioned before the reference time within the vicinity region of the reference game character, whether or not the at least one of the plurality of second game characters moved to outside the vicinity region of the reference game character from within the vicinity region of the reference game character following the movement of any one of the plurality of first game characters other than the reference game character before the reference time to thereby be positioned at the reference time outside the vicinity region of the reference game character;

wherein when it is determined that the at least one of the plurality of second game characters moved to outside the vicinity region of the reference game character from within the vicinity region of the reference game character following the movement of any one of the plurality of first game characters other than the reference game character before the reference time to thereby be positioned at the reference time outside the vicinity region of the reference game character, the second determination means determines that the state was realized by any one of the plurality of first game characters other than the reference game character.

4. A game system according to claim 1, further comprising movement restricting means for restricting, when any one of the second game characters collides with any one of the first game characters, movement of the second game character, wherein the second determination means comprises:
means for determining whether or not at least one of the plurality of second game characters, which moved toward a reference position or toward the reference game character, collided before the reference time with any one of the plurality of first game characters other than the reference game character to thereby be positioned at the reference time outside a vicinity region of the reference position or the reference game character, the reference position being a position where the reference game character was positioned at the reference time;

wherein when it is determined that at least one of the plurality of second game characters, which moved toward the reference position or toward the reference game character, collided before the reference time with any one of the plurality of first game characters other than the reference game character to thereby be positioned at the reference time outside the vicinity region of the reference position or the reference game character, the second determination means determines that the state was realized by any one of the plurality of first game characters other than the reference game character.

5. A game system according to claim 1, further comprising evaluation means for determining, based on the determination result by the determination means, evaluation of actions performed by the plurality of game characters which are reproduced by the reproduction data, wherein the output based on the determination result by the determination means is an output of the evaluation determined by the evaluation means.

6. A game system according to claim 1, wherein when the determination means determines that the specific action was performed before the reference time by any one of first game characters than other the reference game character, the output means outputs the playback video including an image which indicates a moving path of the first game character which performed the specific action.

7. A game system according to claim 1, wherein:
the game system carries out the game in which the plurality of game characters perform an action in a game space;

the playback video is a video indicating a state of the game space viewed from a viewpoint; and the output means comprises setting means for setting the viewpoint, when the determination means determines that the specific action was performed before the reference time by any one of first game characters other than the reference game character, based on the position of the first game character which performed the specific action.

8. A game system according to claim 1, wherein:

the game is a sports game in which a moving object moves;

the plurality of first game characters include a plurality of operation subject characters each corresponding to each of a plurality of users;

the game system further comprises:
  number-of-characters acquiring means for acquiring, based on the reproduction data, a number of operation subject characters that performed an action related to the moving object among the plurality of operation subject characters; and
  condition determining means for determining whether or not the number of operation subject characters acquired by the number-of-characters acquiring means satisfies a predetermined condition; and the game system outputs the playback video when the number of operation subject characters acquired by the number-of-characters acquiring means satisfies the predetermined condition.

9. A game device control method for a game device for carrying out a game in which a plurality of game characters perform an action, the plurality of game characters including a plurality of first game characters belonging to a first group and a plurality of second game characters belonging to a second group that opposes the first group, the control method comprising:
  judging whether or not a reference action was performed by any one of the plurality of first game characters;
  determining, when it is judged that the reference action was performed by any one of the plurality of first game characters that is operated by a first user, whether or not a specific action was performed before a reference time by any one of the plurality of first game characters that is other than a reference game character and that is operated by a second user, based on reproduction data, the reference game character being the first game character that performed the reference action at the reference time, the reference time being a time when the reference action was performed by the reference game character, the reproduction data being data for reproducing actions which the plurality of game characters performed on or before the reference time; and
  outputting a playback video based on the acquired reproduction data, wherein the determining comprises:
  determining, in a first determination based on the reproduction data, when it is judged that the reference action was performed by any one of the plurality of first game characters that is operated by the first user, whether or not none of the plurality of second game characters was positioned at the reference time within a vicinity region of the reference game character; and
  determining, in a second determination based on the reproduction data, when it is judged that the reference action was performed by any one of the plurality of first game characters that is operated by the first user and when it is determined in the first determination that none of the second game characters was positioned at the reference time within the vicinity region of the reference game character, whether or not a state in which none of the second game characters was positioned at the reference time within the vicinity region of the reference game character was realized by any one of the plurality of first game characters that is other than the reference game character and that is operated by the second user, wherein when it is determined in the second determination that the state was realized by any one of the plurality of first game characters that is other than the reference game character and that is operated by the second user, it is determined in the determining that the specific action was performed before the reference time by any one of the plurality of first game characters that is other than the reference game character and that is operated by the second user, and wherein the outputting the playback video includes performing an output based on a determination result of the determining in association with the outputting of the playback video.

10. A non transitory computer-readable information storage medium recorded with a program for causing a computer to function as a game device for carrying out a game in which a plurality of game characters perform an action, the plurality of game characters including a plurality of first game characters belonging to a first group and a plurality of second game characters belonging to a second group that opposes the first group, the program further causing the computer to:
  judge whether or not a reference action was performed by any one of the plurality of first game characters;
  determine, when it is judged that the reference action was performed by any one of the plurality of first game characters that is operated by a first user, whether or not a specific action was performed before a reference time by any one of the plurality of first game characters that is other than a reference game character and that is operated by a second user, based on the reproduction data, the reference game character being the first game character that performed the reference action at the reference time, the reference time being a time when the reference action was performed by the reference game character, the reproduction data being data for reproducing actions which the plurality of game characters performed on or before the reference time; and
  output a playback video based on the reproduction data, wherein the program further causes the computer to:
  determine based on the reproduction data, when it is judged that the reference action was performed by any one of the plurality of first game characters that is operated by the first user, whether or not none of the plurality of second game characters was positioned at the reference time within a vicinity region of the reference game character; and
  determine based on the reproduction data, when it is judged that the reference action was performed by any one of the plurality of first game characters that is operated by the first user and when it is determined that none of the second game characters was positioned at the reference time within the vicinity region of the reference game character, whether or not a state in which none of the second game characters was positioned at the reference time within the vicinity region of the reference game character was realized by any one of the plurality of first game characters that is other than the reference game character that is operated by the second user, wherein when it is determined that the state was realized by any one of the plurality of first game characters that is other than the reference game character and that is operated by the second user, it is determined that the specific action was performed before the reference time by any one of the plurality of first game characters that is other than the reference game character that is operated by the second user, and wherein an output is performed in association with the outputting of the playback video, based on a determination result of whether or not the specific action was performed before the reference time by any one of the plurality of first game characters other than a reference game character.

11. A game system according to claim 3, wherein when the determination means determines that the specific action was performed before the reference time by any one of the first game characters than other the reference game character, the output means outputs the playback video including an image which indicates a moving path of the first game character which performed the specific action.

12. A game system according to claim 4, wherein when the determination means determines that the specific action was performed before the reference time by any one of the first game characters than other the reference game character, the output means outputs the playback video including an image which indicates a moving path of the first game character which performed the specific action.

13. A game system according to claim 5, wherein when the determination means determines that the specific action was performed before the reference time by any one of the first game characters than other the reference game character, the output means outputs the playback video including an image which indicates a moving path of the first game character which performed the specific action.

14. A game system according to claim 3, wherein:
the game system carries out the game in which the plurality of game characters perform an action in a game space;
the playback video is a video indicating a state of the game space viewed from a viewpoint; and
the output means comprises setting means for setting the viewpoint, when the determination means determines that the specific action was performed before the reference time by any one of the first game characters other than the reference game character, based on the position of the first game character which performed the specific action.

15. A game system according to claim 4, wherein:
the game system carries out the game in which the plurality of game characters perform an action in a game space;
the playback video is a video indicating a state of the game space viewed from a viewpoint; and
the output means comprises setting means for setting the viewpoint, when the determination means determines that the specific action was performed before the reference time by any one of the first game characters other than the reference game character, based on the position of the first game character which performed the specific action.

16. A game system according to claim 5, wherein:
the game system carries out the game in which the plurality of game characters perform an action in a game space;
the playback video is a video indicating a state of the game space viewed from a viewpoint; and
the output means comprises setting means for setting the viewpoint, when the determination means determines that the specific action was performed before the reference time by any one of the first game characters other than the reference game character, based on the position of the first game character which performed the specific action.

17. A game system for carrying out a game including a plurality of team game characters and a plurality of opposing team game characters, the game system comprising at least one microprocessor configured to:
determine whether a team game character that is operated by a first user has performed a reference action, the reference action occurring at a reference time;
when it is determined that the team game character that is operated by the first user has performed the reference action, determine whether, prior to the reference time, another team game character that is operated by a second user performed a dummy action to draw away an opposing team game character from a region around the team game character such that the team game character that is operated by the first user could perform the reference action unhindered by the opposing team game character at the reference time; and
when it is determined that the dummy action was performed, output playback video based on the reference action and the dummy action.

* * * * *